(12) United States Patent
Boccio

(10) Patent No.: US 12,017,806 B2
(45) Date of Patent: Jun. 25, 2024

(54) SATELLITE WITH MODULAR RADIATOR PANELS

(71) Applicant: Maxar Space LLC, Palo Alto, CA (US)

(72) Inventor: Joel Boccio, Palo Alto, CA (US)

(73) Assignee: Maxar Space LLC, Palo Alto, CA (US)

(*) Notice: Subject to any disclaimer, the term of this patent is extended or adjusted under 35 U.S.C. 154(b) by 218 days.

(21) Appl. No.: 17/580,966

(22) Filed: Jan. 21, 2022

(65) Prior Publication Data
US 2023/0234724 A1    Jul. 27, 2023

(51) Int. Cl.
    *B64G 1/50*     (2006.01)
    *B64G 1/44*     (2006.01)
    *F28D 21/00*    (2006.01)

(52) U.S. Cl.
    CPC .......... *B64G 1/503* (2013.01); *B64G 1/443* (2013.01); *F28D 2021/0021* (2013.01)

(58) Field of Classification Search
CPC .. B64G 1/503; B64G 1/222; F28D 2021/0021
See application file for complete search history.

(56) References Cited

U.S. PATENT DOCUMENTS

| | | | | |
|---|---|---|---|---|
| 4,133,502 A * | 1/1979 | Anchutin | ............... | B64G 1/222 |
| | | | | 244/172.6 |
| 5,293,171 A * | 3/1994 | Cherrette | ............... | H01Q 1/002 |
| | | | | 343/DIG. 2 |
| 5,699,982 A * | 12/1997 | Daugherty | ............. | B64G 1/503 |
| | | | | 165/41 |
| 5,927,654 A * | 7/1999 | Foley | ................... | B64G 1/2222 |
| | | | | 244/172.6 |
| 6,003,817 A * | 12/1999 | Basuthakur | .............. | B64G 1/50 |
| | | | | 701/13 |
| 6,220,548 B1 * | 4/2001 | Hyman | .................... | B64G 1/58 |
| | | | | 244/172.6 |
| 6,394,395 B1 * | 5/2002 | Poturalski | ............. | H01Q 1/288 |
| | | | | 244/172.7 |
| 6,637,702 B1 * | 10/2003 | McCandless | ........... | H02S 30/20 |
| | | | | 244/172.6 |
| 6,776,220 B1 * | 8/2004 | Low | ......................... | B64G 1/50 |
| | | | | 165/41 |
| 7,762,499 B1 * | 7/2010 | Hentosh | ................... | B64G 1/50 |
| | | | | 165/41 |

(Continued)

FOREIGN PATENT DOCUMENTS

| | | | | |
|---|---|---|---|---|
| CA | | 2199884 A1 * | 9/1997 | |
| CA | | 2543382 A1 * | 10/2006 | ........... F24H 3/0405 |

(Continued)

*Primary Examiner* — Jenna M Maroney
(74) *Attorney, Agent, or Firm* — Vierra Magen Marcus LLP

(57) ABSTRACT

A satellite includes a first radiator panel, a second radiator panel, a space defined between the first radiator panel and the second radiator panel, and one or more first heat-generating components located in the space. Each of the first heat-generating components is attached to at least one of the first or second radiator panels. The satellite further includes a third radiator panel extending from the space and one or more second heat-generating components located in the space, each of the second heat-generating components is attached to the third radiator panel.

20 Claims, 17 Drawing Sheets

(56) References Cited

U.S. PATENT DOCUMENTS

| | | | | |
|---|---|---|---|---|
| 8,714,492 | B2* | 5/2014 | Goodzeit | B64G 1/503 244/171.8 |
| 10,207,825 | B2* | 2/2019 | Hache | B64G 1/506 |
| 10,780,998 | B1* | 9/2020 | Wu | B64G 1/58 |
| 11,760,510 | B1* | 9/2023 | Wu | B64G 1/2224 244/171.7 |
| 2002/0139512 | A1* | 10/2002 | Low | B64G 1/506 165/41 |
| 2003/0121639 | A1* | 7/2003 | Nomura | F28D 15/0275 165/41 |
| 2005/0023415 | A1* | 2/2005 | Walker | B64G 1/222 244/172.6 |
| 2008/0289801 | A1* | 11/2008 | Batty | B64G 1/506 165/104.14 |
| 2010/0019093 | A1 | 1/2010 | Russell | |
| 2010/0045563 | A1* | 2/2010 | Thompson | H01Q 1/288 343/881 |
| 2010/0243817 | A1* | 9/2010 | McKinnon | B64G 1/503 244/171.8 |
| 2013/0233516 | A1* | 9/2013 | Aston | F28D 15/02 165/104.21 |
| 2014/0224939 | A1* | 8/2014 | Wong | B64G 1/503 165/104.26 |
| 2016/0288931 | A1* | 10/2016 | Field | B64G 99/00 |
| 2016/0297551 | A1 | 10/2016 | Cael | |
| 2017/0063296 | A1* | 3/2017 | Cruijssen | B64G 1/443 |
| 2018/0265226 | A1* | 9/2018 | Mena | B64G 1/503 |
| 2019/0329912 | A1* | 10/2019 | Kawamura | B64G 1/503 |
| 2020/0102099 | A1 | 4/2020 | Busche | |
| 2020/0239164 | A1 | 7/2020 | Kalman | |
| 2021/0171224 | A1 | 6/2021 | Chiang et al. | |
| 2021/0180872 | A1 | 6/2021 | O' Coin et al. | |
| 2021/0303290 | A1 | 9/2021 | Schmit et al. | |
| 2021/0318074 | A1* | 10/2021 | McKinnon | F28D 15/0241 |
| 2023/0166871 | A1* | 6/2023 | Freestone | H05K 7/20336 244/171.8 |
| 2023/0234724 | A1* | 7/2023 | Boccio | B64G 1/503 244/172.7 |
| 2023/0322419 | A1* | 10/2023 | Chiang | B64G 1/503 244/171.8 |

FOREIGN PATENT DOCUMENTS

| | | | | |
|---|---|---|---|---|
| EP | 0120662 A1 | * | 10/1984 | |
| EP | 0776827 A1 | * | 6/1997 | |
| EP | 0780304 A1 | * | 6/1997 | |
| EP | 798209 A2 | * | 10/1997 | ........... B64G 1/1007 |
| EP | 2498334 A1 | * | 9/2012 | ........... B64G 1/222 |
| EP | 3042854 A1 | * | 7/2016 | ........... B23P 15/26 |
| EP | 3239057 A1 | * | 11/2017 | ........... B64G 1/222 |
| EP | 3333087 A1 | * | 6/2018 | ........... B64G 1/10 |
| GB | 2455311 A | * | 6/2009 | ........... B64G 1/222 |
| GB | 2475926 A | * | 6/2011 | ........... B64G 1/1078 |
| JP | 2002308199 A | * | 10/2002 | ........... B64G 1/503 |
| WO | WO-2016066936 A1 | * | 5/2016 | ........... F01N 1/023 |
| WO | WO-2017212180 A1 | * | 12/2017 | ........... B64G 1/10 |

* cited by examiner

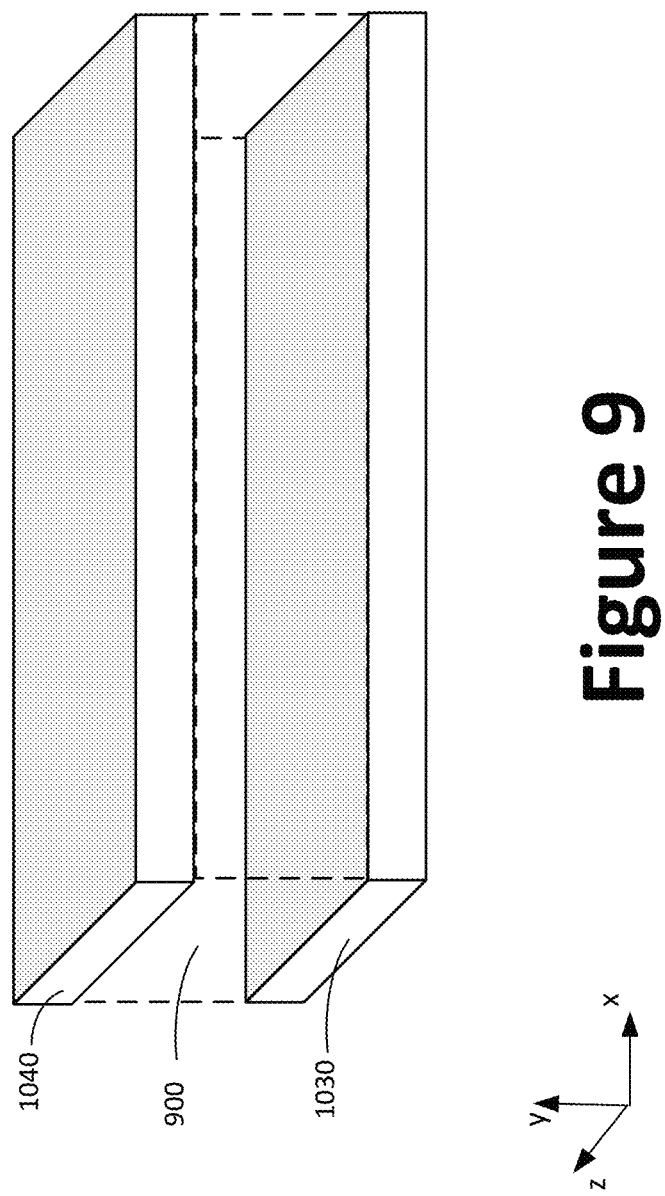

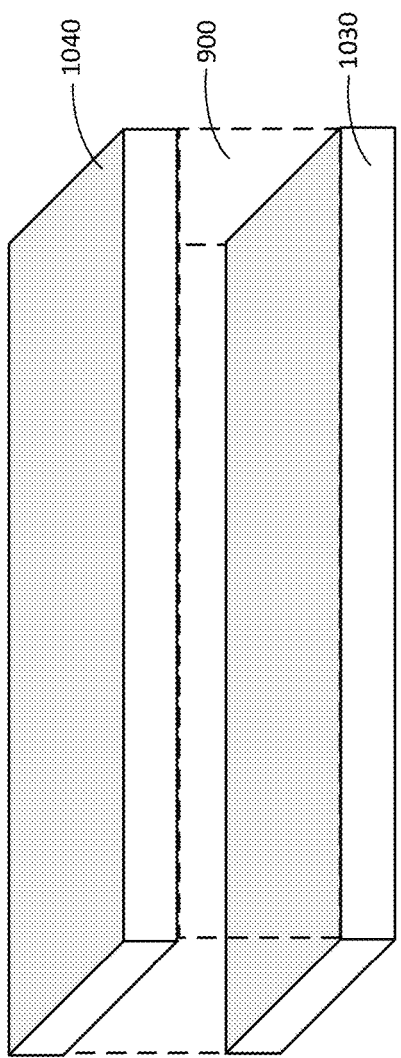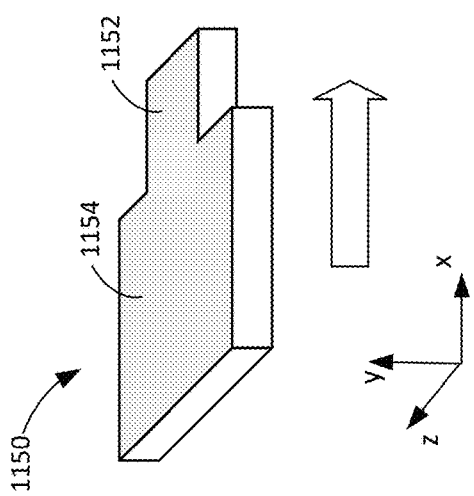
Figure 11A
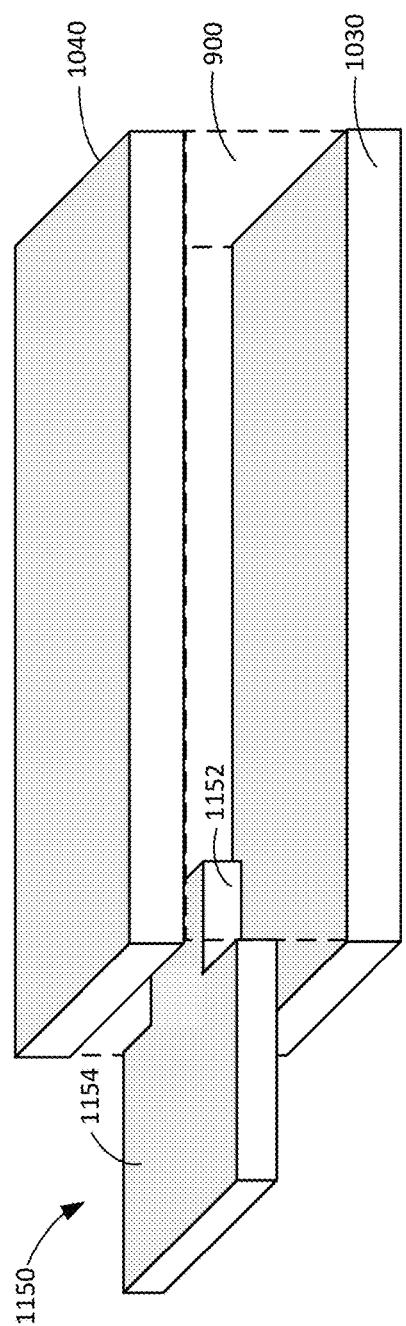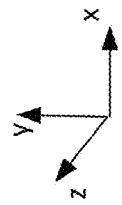
Figure 11B

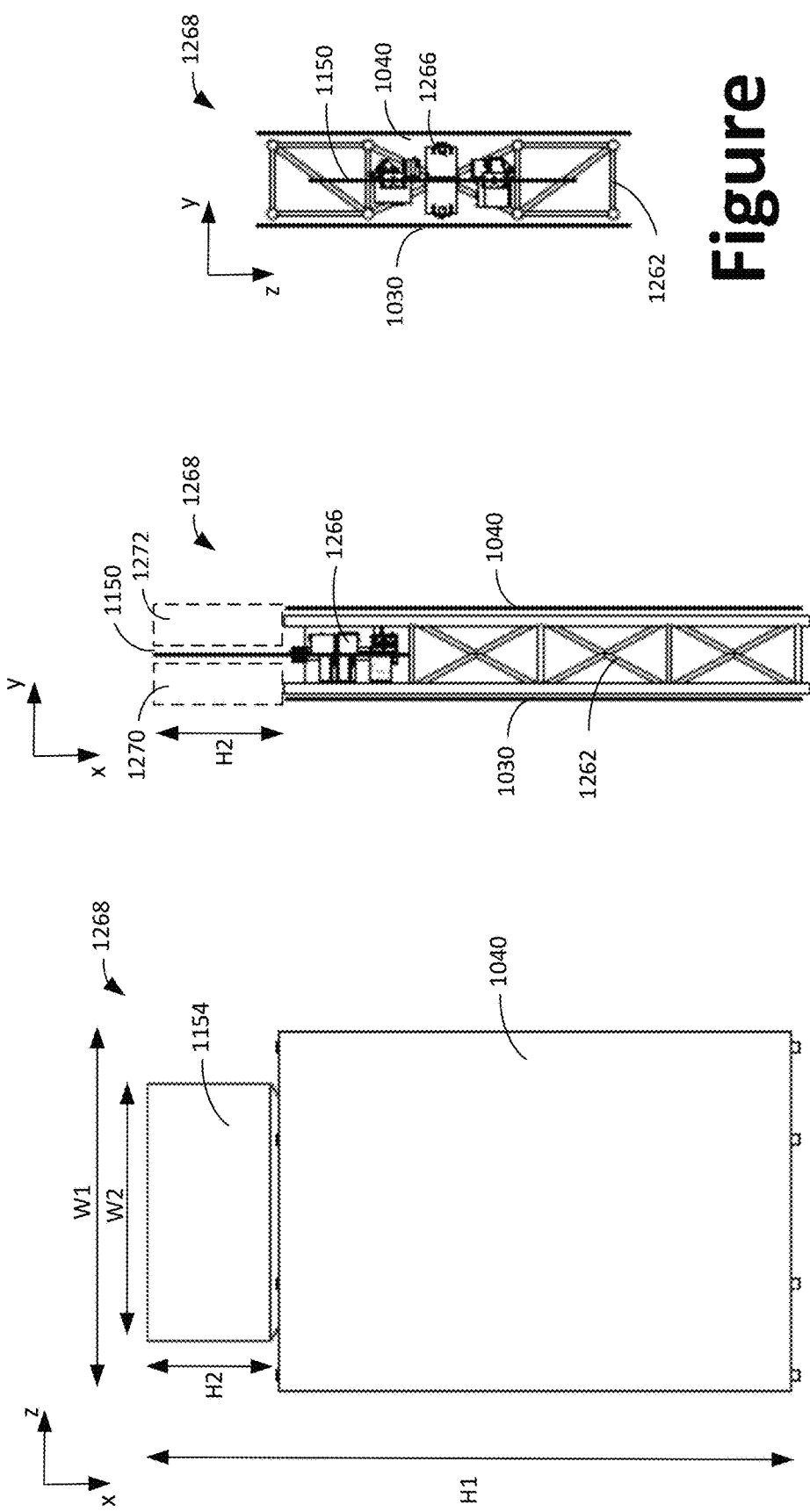

SATELLITE WITH MODULAR RADIATOR PANELS

BACKGROUND

The present disclosure relates to satellite technology.

Satellite communication systems typically include one or more satellites and a set of ground terminals. Such systems typically operate within regulations that allocate operating frequency bandwidth for a particular communications service. Satellites with embedded digital telecommunications payloads can provide advanced features such as reconfigurable switching, beamforming or beam hopping with a high degree of flexibility. However, circuits implementing these, and other features may generate significant heat, which may be problematic. If heat is not adequately managed, temperature of satellite components may rise to unacceptable levels, which may affect operation. Managing heat in space is generally more challenging than other environments (e.g., on or under land, in air, or in water). Designing a satellite to accommodate a substantial digital payload and the heat it may generate while minimizing costs and resources such as mass and size is a challenging task.

BRIEF DESCRIPTION OF THE DRAWINGS

FIG. 9 illustrates a pair of oppositely-facing radiator panels with a space between them.

FIGS. 11A-C illustrate an example of an assembly that includes a pair of oppositely-facing radiator panels and a third radiator panel.

FIGS. 12A-E illustrate an example implementation of an assembly that includes a pair of oppositely-facing radiator panels and a third radiator panel.

DETAILED DESCRIPTION

Figure 1:
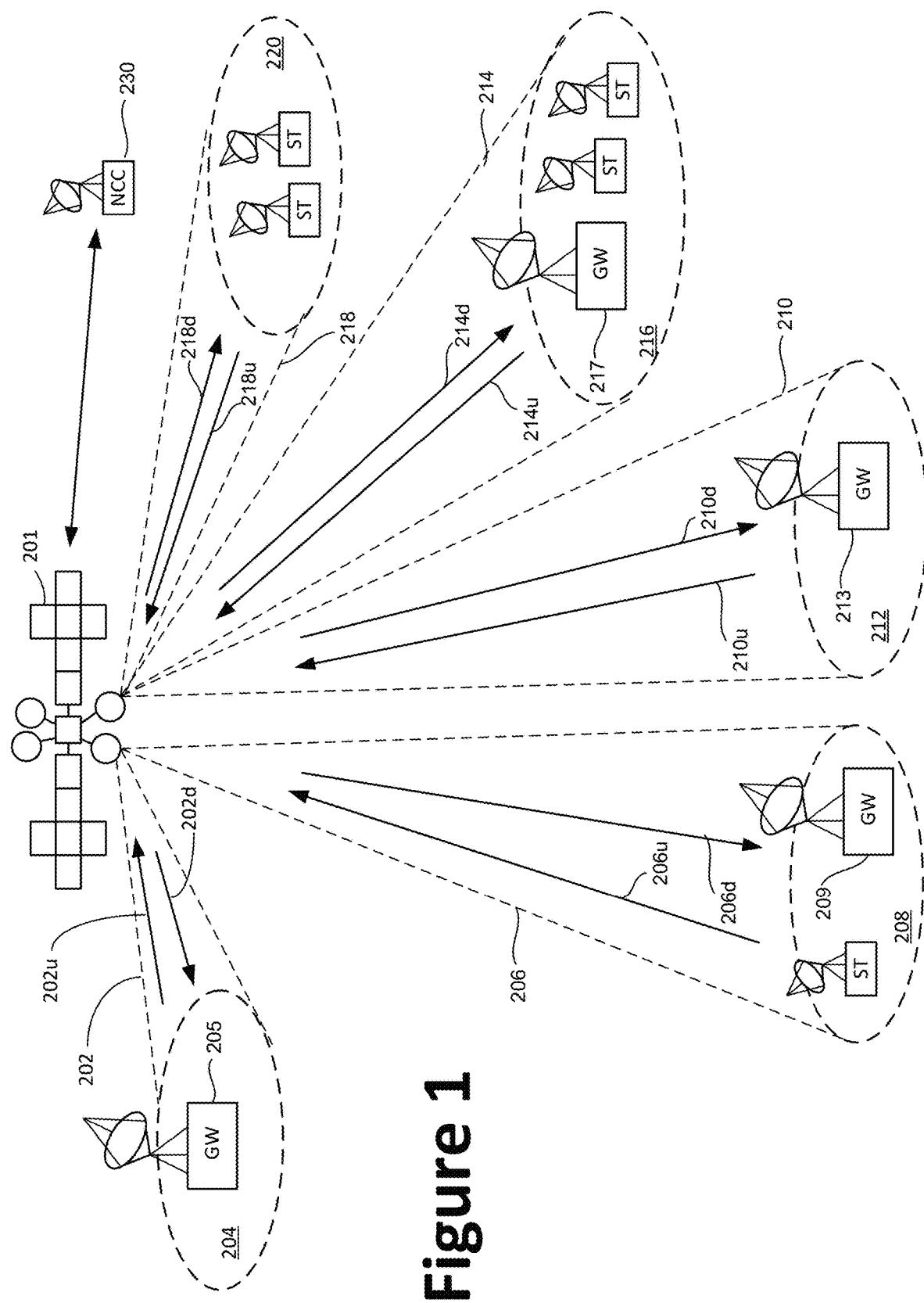
FIG. 1 is a block diagram describing one embodiment of a portion of a satellite communications system.

Aspects of the present technology may be applied to satellites used for various purposes including but not limited to communication. In many satellites, including satellites used for digital communication (e.g., including a digital channelizer and/or other digital circuits), significant heat may be generated by electronic components (e.g., amplifiers and other components). Such heat-generating components may be attached to radiator panels in a manner that enables efficient heat transfer from heat-generating components to radiator panels from which it is radiated into space. In an example, heat-generating components of a satellite are mounted on three or more radiator panels. A space between a pair of oppositely facing radiator panels (e.g., north and south facing) may contain heat-generating components. A third radiator panel may extend from between the pair of radiator panels and may be dedicated to certain heat-generating components located between the pair of radiator panels. For example, payload components may be attached to the pair of radiator panels and all heat from payload components may be radiated by the pair of radiator panels while satellite bus components may be attached to the third radiator panel and all heat from the satellite bus components may be radiated by the third radiator panel. A payload subassembly may be manufactured and tested separately from a bus subassembly prior to being combined into a single assembly. Space on either side of the third panel may be occupied by folded solar panels during launch so that the satellite can be stowed with a compact configuration.

System Overview

Aspects of the present technology may be implemented in a single satellite or in multiple satellites (e.g., in a satellite communication system). A satellite communication system may include a single satellite or a constellation of geostationary or non-geostationary satellites orbiting the Earth, a plurality of gateways GWs and a plurality of subscriber terminals STs (also referred to as terminals). The subscriber terminals STs communicate with the gateways GWs or with other terminals via the satellites. The system can be used to provide access to the Internet or other network, telephone services, video conferencing services, private communications, broadcast services, as well as other communication services.

In general, each satellite provides a plurality of receive and transmit beams which may be formed by analog means such as non-articulated or steerable spot beam antenna, or by analog beamforming networks at the input or output sides of the satellite operating on antenna element signals. The entirety or portions of the spectrum covered by receive beams (receive sub-bands) are routed to the entirety or portions of the spectrum covered by transmit beams (transmit sub-bands). This routing is traditionally performed by analog means (bent pipe payloads). Alternatively, on-board processing can be used to flexibly assign receive sub-bands to transmit sub-bands using a digital channelizer system, which may or may not include beam hopping schemes. Additionally, the digital channelizer system may also be used to form the beams digitally, in which case it will receive as input an array of receive antenna element signals and output an array of transmit antenna element signals. Mixed operating modes are also possible where some of the beams are formed analogically and other beams are formed digitally. Any given beam may also be formed by a combination of analog and digital means (partial analog beamforming).

A digital channelizer allows data from multiple receive modules (receive circuits) to be routed to one or more switch modules (switch circuits), which route data to multiple transmit modules (transmit circuits). The switch modules optionally integrate the circuits to implement digital beamforming, in which case they may also be referred to as "beamforming switch modules (beamforming switch circuits)". A receive module may include a frequency demultiplexer to generate input subchannels from an input and a time-division demultiplexer to demultiplex input subchannels by sample periods and provide different time-division outputs for different time periods.

FIG. 1 is a block diagram depicting a portion of a satellite communications system that includes one or more satellites. FIG. 1 depicts satellite 201, which may be a geostationary satellite or a non-geostationary satellite. A geostationary satellite moves in a geosynchronous orbit (having a period of rotation synchronous with that of the Earth's rotation) in the plane of the Equator, so that it remains stationary in relation to a fixed point on the Earth's surface. This orbit is often achieved at an altitude of 22,300 miles (35,900 km) above the earth; however, other altitudes can also be used. A non-geostationary satellite is a satellite that is not a geostationary satellite and is not in an orbit that causes the satellite to remain stationary in relation to a fixed point on the Earth's surface. Examples of non-geostationary satellites include (but are not limited to) satellites in Low Earth Orbits ("LEO"), Medium Earth Orbits ("MEO") or Highly Elliptical Orbits ("HEO"). Although FIG. 1 only shows one satellite, in some embodiments, the system will include multiple satellites that are referred to as a constellation of satellites, which may communicate with each other.

Figure 2:
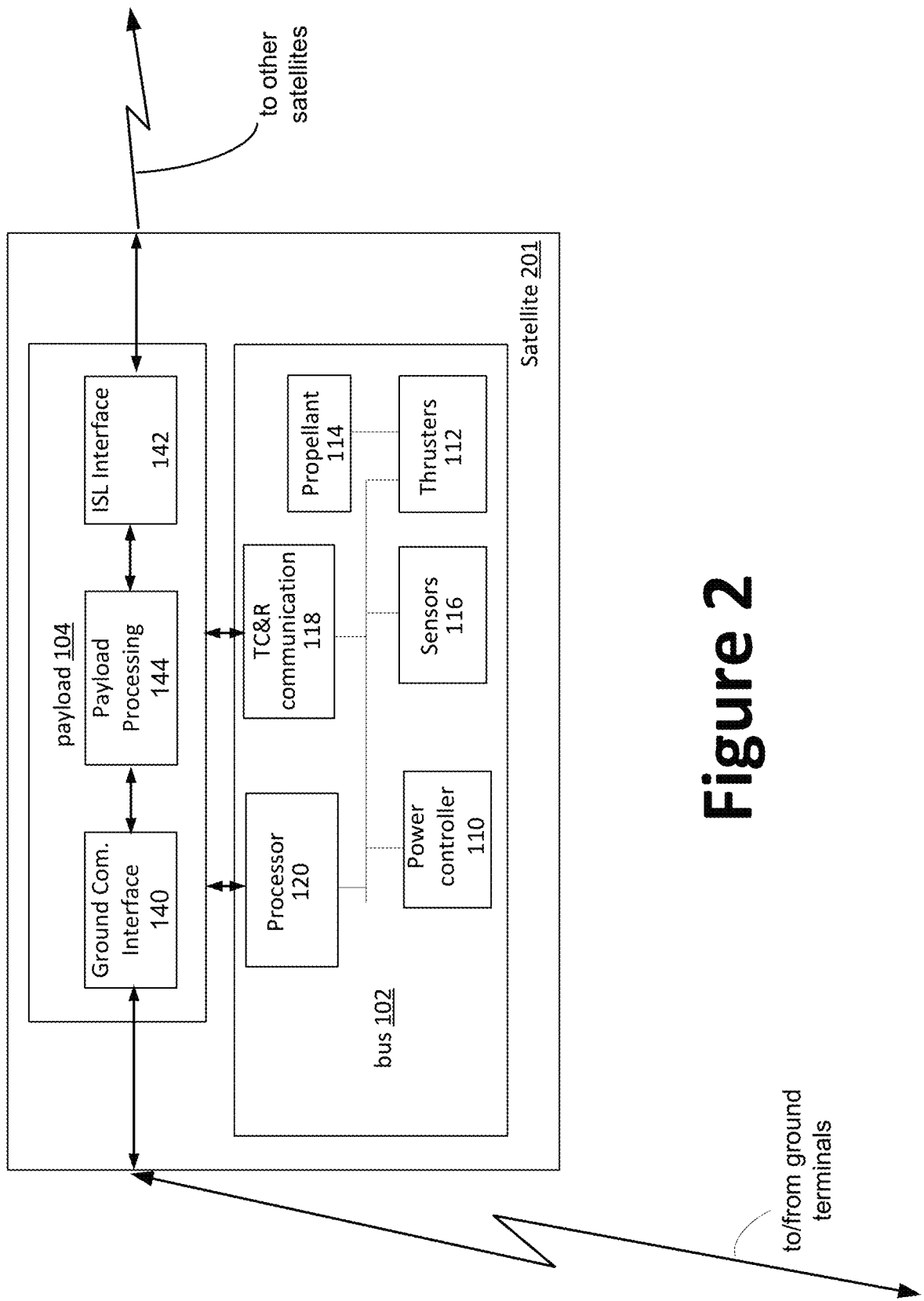
FIG. 2 is a block diagram depicting a satellite including a bus and payload.

In one embodiment, satellite 201 comprises a bus (i.e., spacecraft) and one or more payloads, including a communications payload (e.g., payload 104 and bus 102 of FIG. 2). The satellite 201 may also include multiple power sources, such as batteries, solar panels (e.g., solar panels 1402, 1403 of FIG. 15C, and one or more propulsion systems, for operating the bus and the payload (e.g., bus 102 and payload 104). The satellite 201 includes an antenna system that provides a plurality of beams, including non-articulated and steerable spot beams, for communicating with subscriber terminals STs, gateways GWs and/or other satellites (e.g., spot beams 404, 406, 470, 488 of FIG. 4).

A subscriber terminal ("ST") is a device that wirelessly communicates with a satellite, usually to be used by one or more end users. The term subscriber terminal ST may be used to refer to a single subscriber terminal ST or multiple subscriber terminals STs. A subscriber terminal ST is adapted for communication with the satellite communication system including satellite 201. Subscriber terminals STs may include fixed and mobile subscriber terminals STs including, but not limited to, a cellular telephone, wireless handset, a wireless modem, a data transceiver, a paging or position determination receiver, or mobile radio-telephone, a cellular backhaul, a trunk, an enterprise computing or storage device, an airborne device, a maritime device or a head end of an isolated local network. A subscriber terminal ST may be hand-held, portable (including vehicle-mounted installations for cars, trucks, boats, trains, planes, etc.) or fixed as desired. A subscriber terminal ST may be referred to as a wireless communication device, a mobile station, a mobile wireless unit, a user, a subscriber, a terminal or a mobile.

The term gateway ("GW") may be used to refer to a device that communicates wirelessly with a satellite and provides an interface to a network, such as the Internet, a wide area network, a telephone network or other type of network. In some embodiments, gateways GWs (e.g., GW 205, 209, 213, 217 of FIG. 1) manage the subscriber terminals STs.

FIG. 1 also shows a Network Control Center 230, which includes an antenna and modem (not shown) for communicating with satellite 201, as well as one or more processors and data storage units (not shown). In some embodiments, Network Control Center 230 provides commands to control and operate satellite 201, as well as all other satellite communication payloads in the constellation. Network Control Center 230 may also provide commands to any of the gateways GW (via a satellite or a terrestrial network) and/or subscriber terminals ST.

In one embodiment, satellite 201 is configured to provide two hundred fixed (i.e., non-articulated so that they are fixed in relation to satellite 201) spot beams that use time domain beam hopping among the spot beams (e.g., spot beams 214, 218). In other embodiments, more or less than two hundred spot beams can be used for the time domain beam hopping. In one embodiment, the two hundred hopping beams are divided into thirty-six hopping groups such that one beam in each group is active at a given time; therefore, thirty-six of the two hundred spot beams are active at an instance in time. In addition to the two hundred non-articulated spot beams that perform time domain beam hopping, one embodiment of satellite 201 includes eight 4.2 degree steerable spot beams used to communicate with gateways GWs. In other embodiments, more or less than eight can be used. Additionally, satellite 201 includes six 2.8 degree steerable spot beams which can have a dual purpose of communicating with gateways GWs and/or providing high capacity communication for subscriber terminals STs that would otherwise fall under the hopping beams of the two hundred spot beams performing time domain beam hopping. Other embodiments can use different sized spot beams (e.g., from about 1 degree to about 5 degrees).

For example purposes only, FIG. 1 shows five spot beams: 202, 206, 210, 214 and 218. Spot beam 202 is a 4.2 degree steerable spot beam that broadcasts a signal over coverage area 204 for communicating with one or more gateways GWs 205 via downlink 202d and uplink 202u (e.g., downlink 202u may comprise data packets from one or more Internet servers that are transferred via gateway 205 to one or more subscriber terminals STs and uplink 202d may comprise data packets from one or more subscriber terminals STs that are transferred to Internet servers via gateway GW 205). Spot beam 206 is a 2.8 degree steerable dual-purpose beam that broadcasts a signal over coverage area 208 in order to communicate with one or more gateways GWs 209 and one or more subscriber Terminals STs via downlink 206d and uplink 206u. Spot beam 210 is a 2.8 degree steerable spot beam that could be used to communicate with gateways GWs and/or subscriber terminals STs, but in the example of FIG. 1 spot beam 210 broadcasts a signal over coverage area 212 to communicate with one or more gateways GWs 213 via downlink 210d and uplink 210u. The two hundred spot beams that perform time domain beam hopping can be used to communicate with subscriber terminals STs and/or gateways GWs. Spot beams 214 and 218 are two examples of the two hundred non-articulated spot beams that performed time domain beam hopping. Spot beam 214 broadcasts a signal over coverage area 216 to communicate with one or more gateways GWs 217 and one or more subscriber terminals STs via downlink 214d and uplink 214u. Spot beam 218 broadcasts a signal over coverage area 220 to communicate with subscriber terminals STs via downlink 218d and uplink 218u.

FIG. 2 is a block diagram of one embodiment of satellite 201 of FIG. 1. In one embodiment, satellite 201 includes a bus 102 and a payload 104 carried by bus 102. Some embodiments of satellite 201 may include more than one payload 104. The payload 104 provides the functionality of the communication and/or processing systems described herein (e.g., ground communication interface 140, payload processing 144 and ISL interface 142).

In some embodiments, bus 102 is a spacecraft that provides power for the payload 104 and controls position of the satellite (e.g., to maintain a satellite in a given orbit with a given orientation). For example, the bus components include a power controller 110, which may be connected to solar panels (not shown) and one or more batteries (not shown in FIG. 2) to provide power to other satellite components; thrusters 112; propellant 114; sensors 116; telemetry, command and ranging ("T, C & R") communication and processing equipment 118; and processor 120. Other equipment can also be included. Solar panels, batteries (not shown) and power controller 110 are used to provide power to satellite 100. Thrusters 112 are used for changing the position or orientation of satellite 100 while in space. Propellant 114 is for the thrusters. Sensors 116 are used to determine the position and orientation of satellite 100. T, C & R communication and processing equipment 118 includes communication and processing equipment for telemetry, commands from the ground to the satellite and ranging to operate the satellite. Processor 120 is used to control and operate satellite 201. An operator on the ground can control satellite 201 by sending commands via T, C & R communication and processing equipment 118 to be executed by system processor 120. Some embodiments include a Network Control Center that wirelessly communicates with T, C & R communication and processing equipment 118 to send commands and control satellite 201. In one embodiment, processor 120 and T, C & R communication and processing equipment 118 are in communication with payload 104. In general, electronic components of bus 102 (e.g., processor 120, T, C & R communication and processing equipment 118 and power controller 110) generate heat (e.g., due to resistive heating effects) and may be considered heat-generating components of bus 102.

In one embodiment, the payload 104 includes an antenna system (not depicted in FIG. 2) that provides a set of one or more beams (e.g., spot beams) comprising a beam pattern used to receive wireless signals from ground stations and/or other satellites, and to send wireless signals to ground stations and/or other satellites. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams divide an overall service region into a number of cells. In one embodiment, the antenna system includes a phased array antenna, a direct radiating antenna, or a multi-feed fed reflector.

In some embodiments, Payload 104 also includes payload components such as Ground Communication Interface 140, Inter-satellite Communication Interface 142 and Payload Processing System 144. Ground Communication Interface 140, which is connected to the antenna system (not depicted), is configured to communicate with one or more ground terminals (e.g., send and receive messages to/from gateways GWs and/or subscriber terminals STs). Inter-satellite Communication Interface 142, which is in communication with the antenna system, is configured to communicate with other satellites, e.g., via an in-space network. In general, electronic components of payload 104 (e.g., ground communication interface 140, payload processing system 144 and Inter-satellite communication interface 142) generate heat when in use and may be considered heat-generating components of payload 104.

Figure 3:
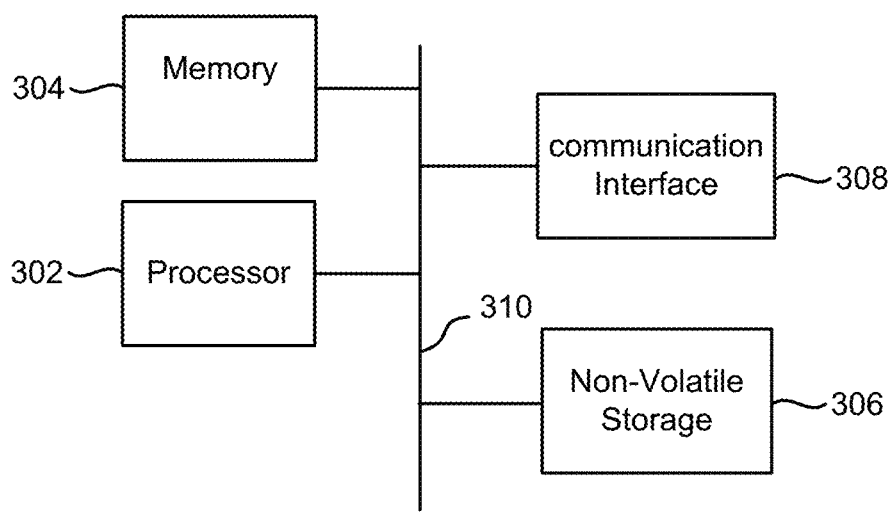
FIG. 3 depicts an example of a payload processing system.

FIG. 3 is a block diagram of one example embodiment of a computing system that can be used to implement Payload Processing System 144. The computer system of FIG. 3 includes a processor 302, main memory 304, non-volatile storage 306, and communication interface 308. Processor 302 may contain a single microprocessor or may contain a plurality of microprocessors for configuring the computer system as a multi-processor system. Main memory 304 stores, in part, instructions and data for execution by processor 302. In embodiments where the proposed technology is wholly or partially implemented in software, main memory 304 can store the executable code when in operation. Main memory 304 may include banks of dynamic random access memory (DRAM) as well as high speed cache memory. Non-volatile storage 306 stores data and instructions for use by processor 302. In one embodiment, non-volatile storage 306 stores the system software for implementing the proposed technology for purposes of loading to main memory 304. Non-volatile storage 306 may be implemented with one or more of a magnetic disk drive, an optical disk drive, a solid state drive, and/or other forms of flash memory. Communication interface 308 cans be any type of electrical and/or optical apparatus for enabling and managing communication, including a network interface for connecting the computer system to a network, a modem, a router, etc. For purposes of simplicity, the components shown in FIG. 3 are depicted as being connected via a single bus 310. However, the components may be connected through one or more data transport means. For example, processor 302 and main memory 304 may be connected via a local microprocessor bus, and non-volatile storage 306 and communication interface 308 may be connected via one or more input/output (I/O) buses. Processor 302, Memory 304, non-volatile storage 306 and communication interface 308 may be considered examples of heat-generating components of a bus.

Figure 4:
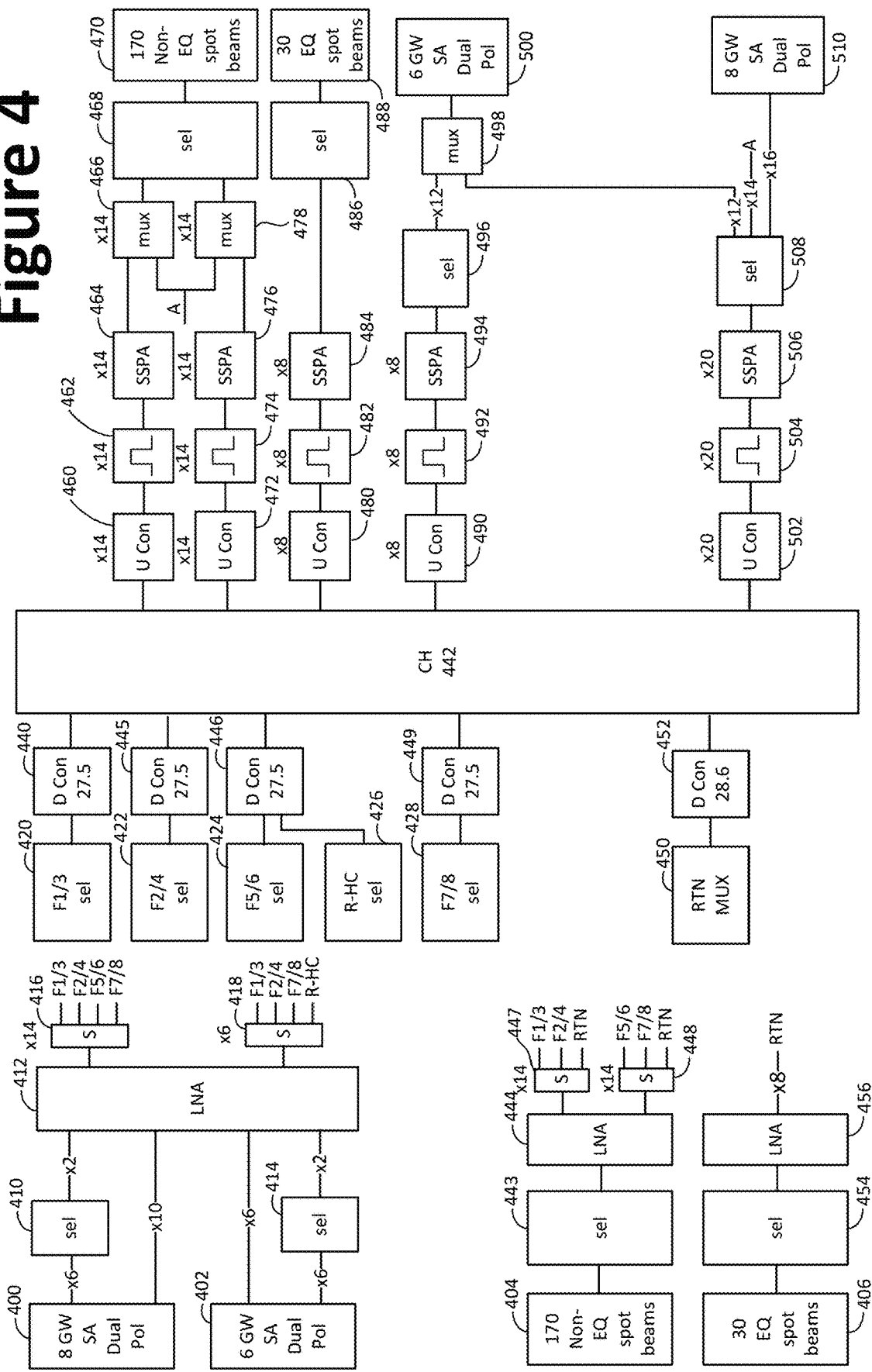
FIG. 4 shows an example of a communications payload that includes a digital channelizer.

FIG. 4 is a block diagram of one embodiment of circuit(s) of a communications payload (e.g., payload 104) for a non-geostationary satellite such as satellite 201. Traditionally, the communications path from the gateway GW to the subscriber terminal ST via the satellite 201 is referred to as the forward path and the communications path from the subscriber terminals STs to the gateway GW via the satellite are referred to as the return path. When a satellite is used to provide connectivity to the Internet, a user at a computer connected to a subscriber terminal ST will send a request for content on the Internet to the gateway GW via the satellite, and the gateway GW will provide, in response to that request, access onto the Internet. The response from the Internet will be provided to the gateway GW, and then forwarded onto the subscriber terminal ST via the satellite.

The circuit(s) of FIG. 4 implements both the forward path and the return path. The uplink beams (e.g., beam conveying uplink 202*u*) are received at the left-hand portion of the components of FIG. 4 and the downlink beams (e.g., beam conveying downlink 202*d*) are provided at the right-hand edge of the components of FIG. 4. For example, FIG. 4 shows eight gateway steerable dual polarization antennas 400 and six gateway/high capacity subscriber terminal steerable antennas 402 with dual polarization for receiving uplink beams. FIG. 4 also shows the two hundred non-articulated spot beams divided into two groups: one hundred and seventy spot beams 404 broadcasting signals over areas away from the Equator and thirty spot beams 406 broadcasting signals over areas at the Equator.

The eight 4.2 degree gateway steerable spot beam antennas 400 provide sixteen signals, eight in each polarization (left hand/right hand or horizontal/vertical). Six ("x6") of those sixteen signals are provided to selection matrix 410 which includes a set of switches that selects two of the six input signals x2 and provides those two selected signals x2 to low noise amplifier 412 (where the notation "xN" in FIG. 4 indicates N signals sent). Ten of the 16 dual polarization signals x10 from antennas 400 are applied directly to low noise amplifier bank 412 comprising low noise amplifiers. The six gateway steerable antennas 402 provide 12 signals (six signals x6 in two polarizations). Six of those signals are provided directly to low noise amplifier bank 412, the other six signals are provided to a 6:2 selection matrix 414, which chooses two of the signals x2 to provide to low noise amplifier bank 412. Note that the satellite payload (e.g., payload 104) will include a processor (e.g., processor 120, not depicted in FIG. 4) which controls each of the selection matrices (e.g., selection matrices 410, 414, 420, 422, 424 and the like) described herein. Alternatively, satellite bus 102 may include a processor (e.g., processor 120) that may control the selection matrices. As described above, low noise amplifier bank 412 has 20 input signals and therefore has 20 output signals. Fourteen of the signals x 14 output from low noise amplifier bank 412 are provided to separate splitters 416. That is, there are 14 splitters 416. Each splitter splits the incoming signal into four copies noted as: F1/3, F2/4, F5/6 and F7/8. The other six outputs x6 from LNA 412 are provided to a different set of splitters 418 that split the signal to four copies labeled as: F1/3, F2/4, F7/8 and R-HC. The seven outputs of the splitter that started with an F are part of the forward path. The one output of the splitter 418 that is labeled R-HC is part of the return path from a steerable high capacity spot beam used to connect to subscriber terminals STs. In one embodiment splitters 416 and 418 include filters for passing the frequency bands of the labeled output and stopping all other frequencies.

After the splitters 416 and 418, the signals are sent to appropriate matrices 420, 422, 424, 426 and 428 in order to select which bands to use. Selection matrix 420 receives the signal F1/3. Selection matrix 422 receives signal F2/4. Selection matrix 424 receives signal F5/6. Selection matrix 426 receives signal R-8C. Selection matrix 428 receives F7/8. Eleven signals of the output of selection matrix 420 are provided to down converter 440, which provides its output to channel 442. The 11 signals of the output of selection matrix 422 are provided to down converter 445, which provided its output to channelizer 442. The output of selection matrix 424 includes seven signals that are provided to down converter 446, which provides its output to channelizer 442. The output of selection matrix 426 includes six signals that are provided to down converter 446, which provides its output to channelizer 442. The output of selection matrix 428 includes 11 signals that are provided to down converter 449, which provides its output to channelizer 442. Each of the selection matrices includes a series of programmable switches to route a subset of inputs to the output ports.

The one hundred and seventy non-Equatorial spot beams 404 are provided to selection matrix 443 which chooses twenty-eight signals out of the one hundred and seventy signals corresponding to the one hundred and seventy spot beams. That is, one beam from each of 28 beam hopping groups (discussed below) is chosen by selection matrix 443 selecting a corresponding signal. Those 28 signals are sent to low noise amplifier 444. Half of the signals (x14) output from low noise amplifier 444 are provided to splitters 447. The other half of the signals (x14) are provided to splitters 448. Each of the fourteen splitters 447 make three copies of the signal and output those three copies as F1/3, F2/4 and RTN. Each of the fourteen splitters 448 make three copies of their respective incoming signals and output them F5/6, F7/8 and RTN. Note that the signals F1/3, F2/4, F5/6 and F7/8 are part of the forward path representing communication from a gateway GW in one of the one hundred and seventy hopping beams. The signal RTN is part of the return path, from subscriber terminals STs. Note that in some embodiments, each of the splitters has appropriate band pass filters. In some embodiments, each of the selection matrices has appropriate band pass filters at respective inputs and/or outputs.

FIG. 4 shows the thirty non-articulated beam hopping spot beams near the Equator being provided to selection matrix 454. The eight selected signals (x8) are provided to low noise amplifier 456 which outputs a signal labeled RTN. Note in some embodiments, each of the low noise amplifiers 456, 444 and 412 have band pass filters at their input and/or output. Additionally, band pass filters can be used at each of the antennas 400, 402, 404 and 406. Based on the output of splitters 448 and low noise amplifier 456, thirty-six signals labeled RTN are frequency combined in MUX 450 which outputs 9 signals. The output of MUX 450 is provided to down converter 452. The output of down converter 452 is provided to channelizer 442. Each of the selection matrices 410, 414, 420, 422, 424, 426, 428, 443 and 454 includes switches that are used to switch throughput among the various spot beams in the hopping groups or among various bands from the gateways GWs and high capacity steerable spot beams. The chosen signals are provided to channelizer 442 which is used to route spectrum between the uplinks and downlinks. In one embodiment, channelizer 442 is a digital channelizer that is fully programmable in orbit. Channelizer 442 can be thought of as a large switching or routing matrix that is fully programmable. FIG. 4 shows that channelizer 442 provides fourteen outputs (x14) to upconverter 460, fourteen outputs (x14) to upconverter 472, eight outputs (x8) to upconverter 480, eight outputs (x8) to upconverter 490 and twenty outputs (x20) to upconverter 502. Note that upconverters 460, 472, 480 and 490 (all which function to increase the frequency of the signal) are provided as part of the forward path, while upconverter 502 is provided for the return path. The output of each of the 14 upconverters 460 are provided to filters 462. The output of each of the fourteen filters 462 are provided to solid state power amplifiers (SSPA) 464. The output of each of the fourteen SSPAs are provided to multiplexer 466. The output of multiplexer 466 is provided to 28:170 selection matrix 468. The 170 outputs of selection matrix 468 are provided as the one hundred and seventy non-Equatorial non-articulated beam hopping spot beams 470.

The output of the fourteen upconverters 472 are provided to separate filters 474. The output of each of the fourteen filters 474 is provided to separate SSPAs 476. The output of each of the fourteen SSPAs 476 are provided to multiplexer 478. The output of multiplexer 478 is provided to selection matrix 468. The output of the eight upconverters 480 are provided to filters 482. The output of the eight filters 482 are provided to separate SSPAs 484. The outputs of SSPAs 484 are provided to selection matrix 486. The output of selection matrix 486 is provided as the thirty Equatorial region non-articulated beam hopping spot beams of 488. Note that the SSPAs can be turned off (e.g., when the satellite is over the ocean or other non-inhabited area) to conserve power.

The output of upconverters 490 (which can be part of the forward path or the return path) are provided to filters 492. The output of the eight filters 492 are provided to SSPAs 494. The output of the eight SSPAs 494 are provided to selection matrix 496. The 12 output signals from selection matrix 496 are provided to multiplexer 498. The output of multiplexer 498 are provided as the six 2.8 degree gateway/high capacity subscriber terminals STs steerable spot beams, with dual polarization.

The outputs of upconverters 502 are provided to separate filters 504. The output of the twenty filters 504 are provided to separate SSPAs 506. The output of the 20 SSPAs 506 are provided to selection matrix 508, which provides 42 outputs. Twelve of the 42 outputs are provided to multiplexer 498, fourteen of the 42 outputs are provided to multiplexer 466 and multiplexer 478, and sixteen of the 42 outputs are provided as the eight gateway steerable dual polarization spot beams described above.

In an alternative embodiment, many or all of the selection matrices can be eliminated by having the selection/switching performed by channelizer 442. In some embodiments, the payload of FIG. 4 (e.g., payload 104) can be fully implemented by just a channelizer that will switch, route and filter. Such a channelizer may be configurable for a range of different conditions so that a generic channelizer may be configured for a given application. For example, a channelizer may be configurable to route a relatively large number of low-capacity communication channels or a relatively small number of high-capacity communication channels. Furthermore, such a channelizer may, in some cases, be configurable to implement a beamforming scheme, e.g., to provide outputs to phased array elements to produce a beam that is oriented in a particular direction. Such a channelizer may provide additional flexibility and may reduce the hardware complexity with respect to the baseline system. Channelizer 442 and other components shown in FIG. 4 (e.g., various amplifiers such as LNAs 412, 444, 456) may be considered examples of heat-generating components of a payload (e.g., payload 104).

Figure 5:
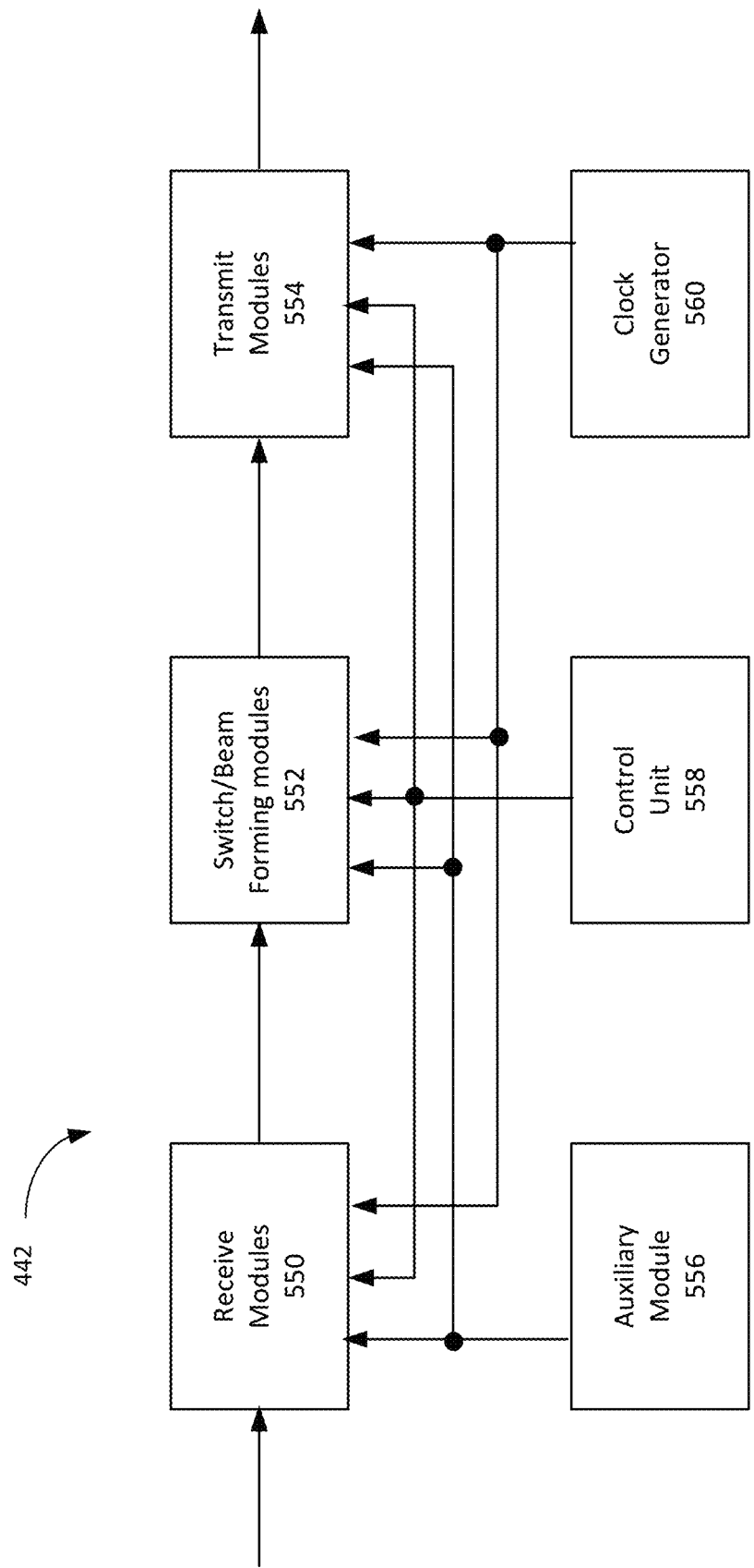
FIG. 5 illustrates an example of a digital channelizer.

FIG. 5 is a block diagram describing one example implementation of channelizer 442. The technologies described herein are not limited to any one particular architecture or implementation of channelizer 442. The embodiment of FIG. 5 is only one example that is suitable for the technology described herein and many other configurations are also usable. Inputs to channelizer 442 are provided to a receive module 550 (or "receive circuit"), where signals can be filtered, amplified, stored or simply received. The output of receive module 550 is provided to switch network and beam forming network 552. The output of switch network and beam forming network 552 is provided to a transmission module 554 which provides the outputs of channelizer 442. Channelizer 442 also includes an auxiliary module 556, control unit 558 and clock generator 560, which are all connected to receive module 550, switch network/beam forming network 552 and transmission module 554. In one embodiment, control unit 558 includes one or more processors used to program the switch networks/beam forming network 552. Clock generator 560 provides a clock signal to implement timing within channelizer 442. In one embodiment, auxiliary module 556 is used to control the switches of the switching network, adjust beams, provide spectrum analysis and provide uplink and downlink modems.

In general, electronic circuits generate heat as electrical current flows through devices (e.g., due to electrical resistance of electronic devices, wires, connectors, etc.). While some components may be optimized for particular parameters (e.g., for a particular frequency) other components may be configurable and may not be optimized when in use (e.g., amplifiers used across a range of different frequencies may be less efficient than amplifiers designed for a particular frequency). This may mean that configurable components (e.g., amplifiers) operate under less than optimal conditions, which may result in more heat than if they were operating under optimal conditions. Digital circuits such as those described above that are used in a satellite bus or payload (e.g., payload 104) may generate significant heat. Maintaining the temperature of such components and maintaining overall satellite temperature within acceptable limits may be challenging in space. Many electronic and other components operate effectively only within a particular temperature range and may fail outside that range. Therefore, removal of heat from heat-generating devices (e.g., any of the bus or payload components described above) may be important for satellite operation. Efficiently removing such heat may be challenging in conventional satellites.

Figure 6:
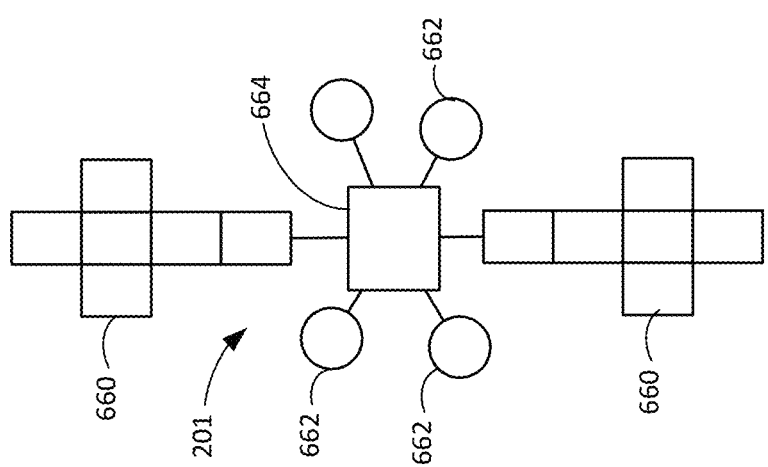
FIG. 6 shows an example satellite including a central body.

FIG. 6 illustrates an example of satellite 201 that includes solar panels 660 and antennas 662 extending from a central body 664. In general, satellite bus and payload components may be located together in such a central body. In some cases, a central body may include one or more radiator panels to radiate heat generated by heat-generating components.

Figure 7:
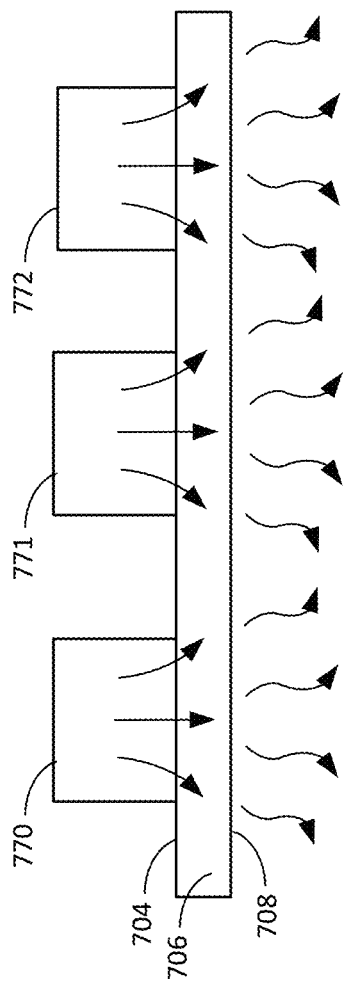
FIG. 7 illustrates heat-generating components attached to a radiator panel.

FIG. 7 shows an example of mounting of heat generating components in central body 664 of satellite 201. Heat-generating components 770, 771, 772 are attached to a first surface 704 of a radiator panel 706 so that heat generated in heat-generating components 770-772 can easily flow into radiator panel 706, where it is dispersed laterally and can be radiated into space from a second surface 708 of radiator panel 706 (as illustrated by wavey arrows).

Figure 8:
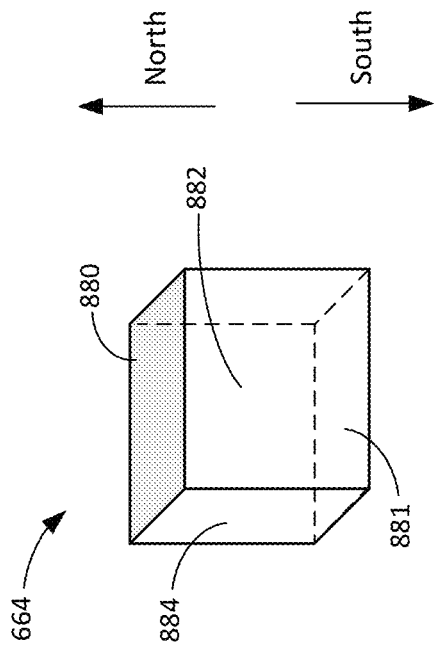
FIG. 8 illustrates orientation of radiator panels of a satellite.

FIG. 8 shows an example that includes a radiator panel on the north facing side 880 of central body 664. A central body may have a cubic or rectangular shape with six sides and may have certain sides that are more suitable for radiating heat. For example, north facing side 880 and south facing side 881 may be suitable for radiating heat because they are generally not facing the sun so that any radiated heat from the sun hits them obliquely at a low angle and does not cause substantial heating. In an example, a pair of oppositely-facing radiator panels is provided along surfaces of north facing side 880 and south facing side 881. Other sides such as west facing side 882 or earth-facing side 884 may be subject to radiated heat from the sun at angles close to ninety degrees at certain times, which may cause significant heating and make these sides less suitable for radiator panels.

FIG. 9 illustrates an example of a pair of oppositely-facing radiator panels (e.g., radiator panels along north facing side 880 and south facing side 881) that form a space between them where heat-generating components may be located. First radiator panel 1030 and second radiator panel 1040 are parallel (e.g., extend along parallel first and second planes that extend perpendicular to the y-axis in FIG. 9), have substantially similar size and shape (rectangular) and are aligned so that they are overlapping (coextensive). Thus, the dimensions of first radiator panel 1030 and second radiator panel 1040 in the x and z dimensions may be substantially the same (e.g., identical or different by a small amount such as 1% or 5%) and their positions in their respective planes may be aligned (e.g., substantially similar x and z coordinates). First radiator panel 1030 and second radiator panel 1040 may be maintained a fixed distance apart so that a space 900 is formed between them (shown by dotted lines in FIG. 9) in a sandwich arrangement. Because first radiator panel 1030 and second radiator panel 1040 are rectangular in this example, space 900 is rectangular in shape also (in other examples, radiator panels and resulting spaces formed between pairs of such radiator panels may be differently shaped). Space 900 may provide a location for placement of satellite components in various examples presented here.

Figure 10A:
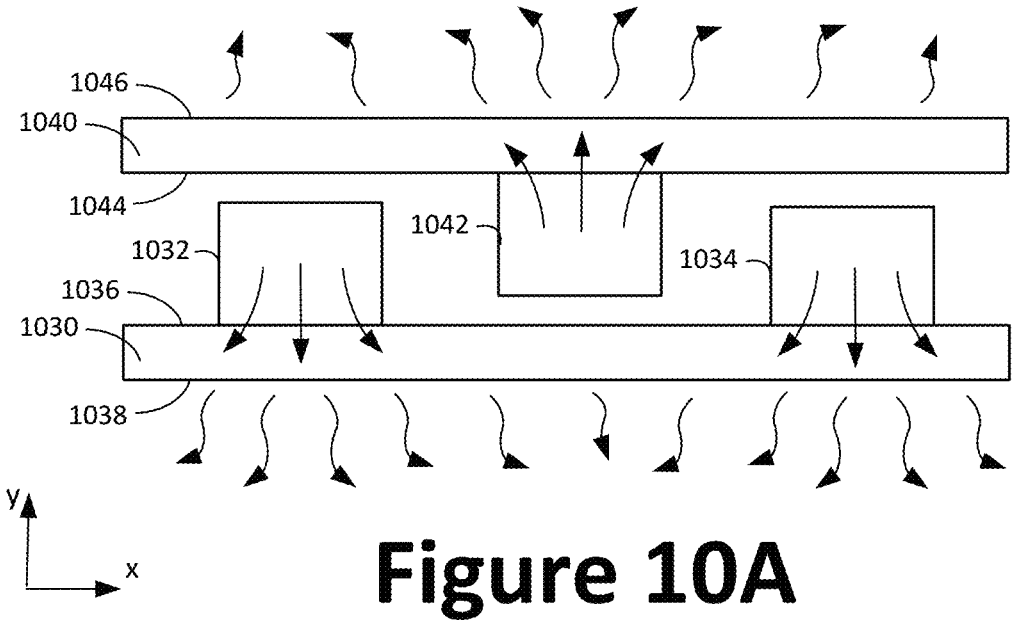
FIGS. 10A-B illustrate examples of heat-generating components attached to a pair of oppositely-facing radiator panels.

FIG. 10A shows a first example of heat-generating components between a pair of oppositely-facing radiator panels (e.g., in space 900 of FIG. 9). First radiator panel 1030 receives heat from first heat-generating components 1032, 1034 and radiates heat into space. First heat-generating components 1032, 1034 are attached to a first surface 1036 of first radiator panel 1030 and heat is radiated from a second surface 1038 of first radiator panel 1030.

Second radiator panel 1040 extends parallel to first radiator panel 1030. Relative positions of first radiator panel 1030 and second radiator panel 1040 may be fixed so that they remain in the configuration shown (parallel, a fixed distance apart). For example, posts, bolts, brackets, a lattice, a frame and/or other components may be used to fix the relative locations of first radiator panel 1030 with respect to second radiator panel 1040. A second heat-generating component 1042 is attached to a first surface 1044 of second radiator panel 1040 and heat is radiated from a second surface 1046 of second radiator panel 1040. Offsetting locations of first heat-generating components 1032, 1034 and second heat-generating component 1042 allows heat-generating components to be closely packed thereby reducing size, while providing radiator panels above and below (in this view) provides a high capacity for dissipating and radiating heat to accommodate significant heat generated by such components. For example, where a satellite is oriented so that the y-direction shown is north, first radiator panel 1030 radiates heat to the south while second radiator panel 1040 radiates heat to the north.

Figure 10B:
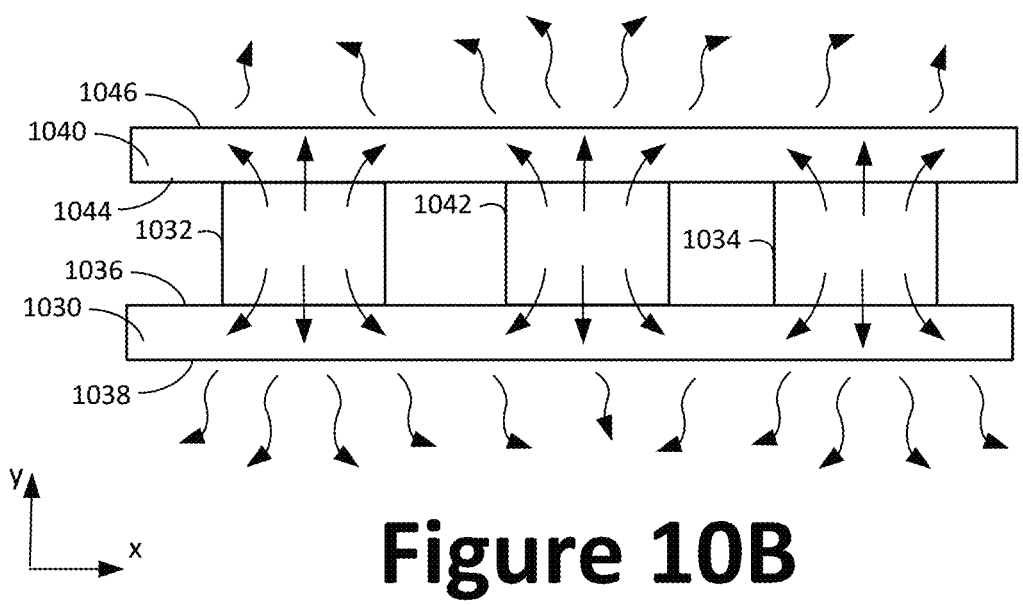

FIG. 10B illustrates another example of heat-generating components in a space between parallel oppositely-facing radiator panels. FIG. 10B shows an alternative arrangement to that of FIG. 10A in which heat-generating components 1032, 1034, 1042 are each attached to two radiator panels so that heat from each heat-generating component can move along two opposite pathways (e.g., along the positive y-direction or negative y-direction, which may correspond to north and south when satellite is in operation). Such attachment to opposite-facing pairs of radiator panels may allow heat dissipation through one radiator panel when the other radiator panel is not operating optimally (e.g., when one panel has incident solar radiation because of the satellite section's orientation, the other panel is shaded from solar radiation and can operate efficiently). In examples shown in both FIGS. 10A and 10B heat-generating components are located in a space between two radiator panels that are in a fixed position (relative to each other) to allows efficient heat dissipation from heat-generating components.

Heat-generating components may be attached to radiator panels (in this and any other examples described here) so that heat flows easily from heat-generating components into radiator panels. Heat-generating components may be directly attached to radiator panels (e.g., with direct physical contact over a significant area) or may be indirectly attached in a configuration that enables heat flow. Thermally conductive material may be used for attachment to ensure good heat flow. In general, heat flows relatively short distances in such a sandwich arrangement so that active components (e.g., pumps for coolant) may not be necessary which provides reliability and power-consumption benefits.

In some satellites, two radiator panels (e.g., first radiator panel 1030 and second radiator panel 1040) may radiate all heat from heat-generating components (e.g., both bus and payload components), which may be located in the space between radiator panels (e.g., space 900).

According to aspects of the present technology, a satellite includes a pair of radiator panels in parallel (e.g., as shown in FIGS. 8-10B) that form a space between them, and further includes a third radiator panel that extends from the space, beyond the pair of radiator panels. Some (first) heat-generating components are attached to the pair of radiator panels as previously described (e.g., individual components attached to one or both radiator panels of the pair) while other (second) heat-generating components are attached to the third radiator panel. In an example, the (first) heat-generating components attached to the pair of radiator panels are payload components (e.g., components of payload 104 discussed above, which may include a digital channelizer and amplifiers as illustrated in FIGS. 4-5) and the (second) heat-generating components attached to the third radiator panel are satellite bus components (e.g., components of bus 102 as illustrated in FIGS. 2-3). In this way, payload components may be assembled with the pair of radiator panels while bus components are separately assembled with the third radiator panel so that the payload and bus portions are assembled as separate modules. The payload and bus portions (subassemblies) may be separately tested prior to being combined during assembly of the satellite. This modularity facilitates manufacture and testing.

FIG. 11A shows an example that includes first radiator panel 1030, second radiator panel 1040 and a third radiator panel 1150. Third radiator panel 1150 is shown apart from first radiator panel 1030 and second radiator panel 1040 (e.g., prior to being combined with first radiator panel 1030 and second radiator panel 1040 by moving it in the direction shown by the arrow during assembly of the satellite). Third radiator panel 1150 includes an internal portion 1152 and an external portion 1154. Various components (not shown in FIGS. 11A-B) may be attached to radiator panels prior to assembly. For example, first heat-generating components (e.g., satellite payload components) may be attached to one or both of first radiator panel 1030 and second radiator panel 1040 (which may be considered a pair of payload radiator panels in this example) to form a satellite payload subassembly or module. Separately (e.g., at a different location and/or different time and/or by a different entity), second heat-generating components (e.g., satellite bus components) may be attached to third radiator panel 1150 (which may be considered as a bus radiator panel in this example) to form a satellite bus subassembly or module. Each of these subassemblies may be tested and configured separately prior to being combined.

In another example, third radiator panel 1150 may provide an additional thermal zone that is used to accommodate components (payload and/or bus components) that have particular heat requirements (e.g., requiring lower or higher temperature than other components). Some components may need to run at a lower (or higher) temperature than others and third radiator panel 1150 may be sized appropriately to keep second heat-generating components at a second temperature that is lower (or higher) than a first temperature of the first components attached to first radiator panel 1030 and second radiator panel 1040. For example, in some cases, it may be desirable to operate some payload components (e.g., low noise amplifiers such as LNAs 412, 444, 456) at significantly lower temperatures than other components. In some cases, it may be desirable to operate some payload components (e.g., power amplifiers such SSPAs 464, 476, 484, 492, 506) at significantly higher temperatures than other components. It may also be desirable to locate such components close to feeds in order to reduce line losses. Achieving a desired temperature ranges for such components while keeping line losses resulting from distances to feeds within acceptable ranges is challenging. Aspects of the present technology allow payload components (e.g., amplifiers such as LNAs and/or SSPAs) to be mounted to a radiator panel (e.g., third panel 1050) that may be operated at a lower (or higher) temperature range than other radiator panels (e.g., lower or higher than first radiator panel 1030 and second radiator panel 1040). In this example, second heat-generating components are payload components that have different (lower or higher) temperature requirements than other components. This may be an alternative to using third radiator panel 1050 as a dedicated bus radiator panel. In another alternative, one or more additional radiator panels (e.g., a fourth radiator panel) may be used so that some payload components are attached to first radiator panel 1030 and second radiator panel 1040 (first components), all bus components are attached to third radiator panel 1050 (second components) and additional bus components (e.g., components requiring lower or higher temperature) are attached to additional radiator panel(s) (e.g., a fourth radiator panel) that may be similar to third radiator panel 1050 and may extend from between first radiator panel 1030 and second radiator panel 1040 at a different location (e.g., from the opposite end along x-direction in FIG. 11A, or from sides along z-direction). Thus, in addition to a pair of oppositely-facing radiator panels, one or more additional radiator panels (e.g., third, fourth, fifth, etc.) may enable different thermal zones and/or provide dedicated radiator panels for different modules (e.g., for a payload and bus).

FIG. 11B shows internal portion 1152 lying between first radiator panel 1030 and second radiator panel 1040 (in space 900) while external portion 1154 extends beyond space 900 (e.g., after subassemblies are combined during satellite assembly). Third radiator panel 1150 lies parallel to first radiator panel 1030 and second radiator panel 1040 (e.g., having surfaces facing north and south when in orbit) and external portion 1154 is exposed (unobstructed) along the y-axis (in both the positive y-direction and negative y-direction, which may correspond to north and south when in orbit). Third radiator panel 1150 is located approximately half way between first radiator panel 1030 and second radiator panel 1040 in this example (spacing may be different in other examples).

Figure 11C:
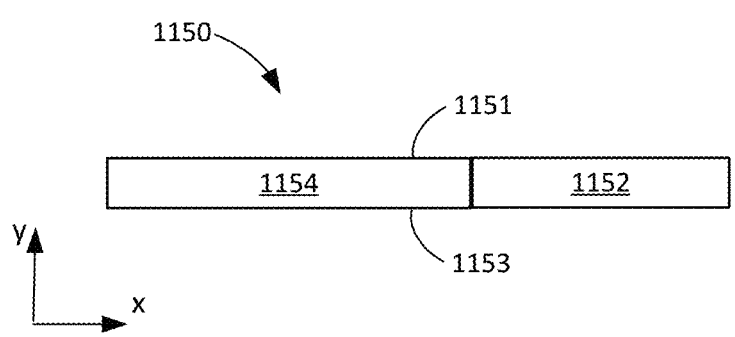

FIG. 11C shows third radiator panel 1150 in cross section including external portion 1154 and internal portion 1152. Third radiator panel 1150 has first side 1151 and second side 1153 (which are oppositely-facing and may be north facing and south facing respectively when in use). In some examples, heat-generating components (not shown in FIG. 11C) may be attached to one or both of first side 1151 and/or second side 1153 of third radiator panel 1150.

FIGS. 12A-E illustrate an example implementation of the present technology with first radiator panel 1030, second radiator panel 1040 and third radiator panel 1050 combined to form an assembly that may used as the central body of a satellite.

Figure 12B:
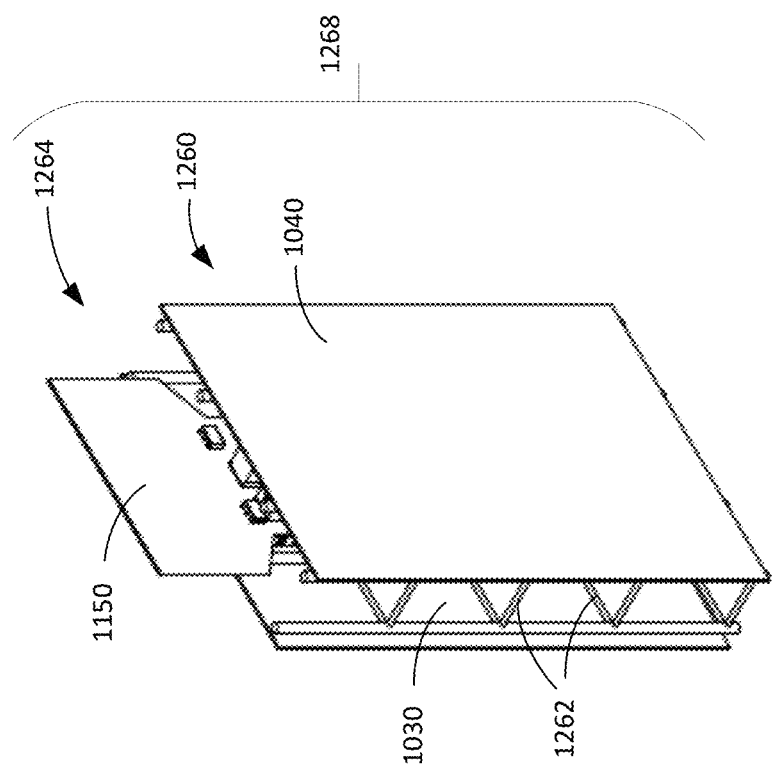
Figure 12A:
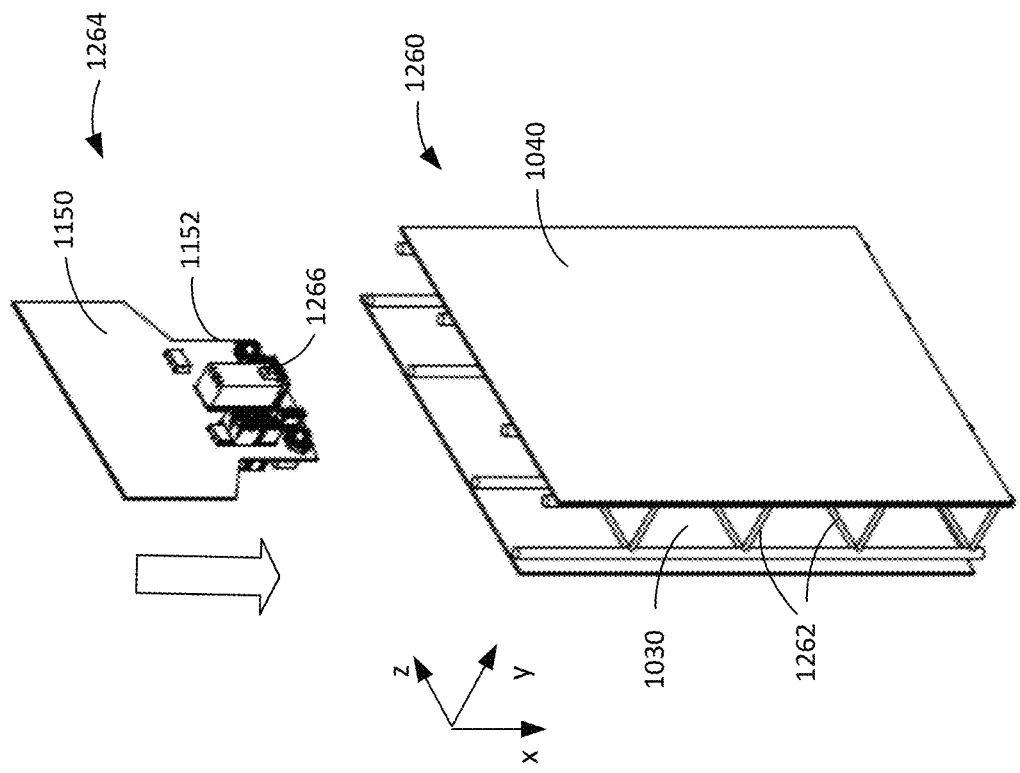

FIG. 12A shows a first subassembly 1260 that includes first radiator panel 1030, second radiator panel 1040 and a frame 1262 (only portions of frame 1262 are visible in the perspective view of FIG. 12A). First subassembly 1260 also includes various heat-generating components (first heat-generating components), which are not visible in this view. First heat-generating components are attached to one or both of first radiator panel 1030 and/or second radiator panel 1040. For example, first heat-generating components may be satellite payload components (e.g., components of payload 104) and, in this case, first subassembly 1260 may be considered a satellite payload subassembly.

FIG. 12A also shows second subassembly 1264 that includes third radiator panel 1150 and includes additional heat-generating components 1266 (second heat-generating components) attached to internal portion 1152 of third radiator panel 1150. Second heat-generating components 1266 may be attached to one or both sides of third radiator panel 1150. For example, second heat-generating components 1266 may be satellite bus components (e.g., components of satellite bus 102) and, in this case, second subassembly 1264 may be considered a satellite bus subassembly. In this example, first heat-generating components produce more heat than second heat-generating components so that combined first radiator panel 1030 and second radiator panel 1040 are larger than third radiator panel 1150. Second subassembly 1264 may be combined with first subassembly 1260 by partially inserting second subassembly 1264 in the space between first radiator panel 1030 and second radiator panel 1040 (in the direction of the arrow) and connecting the assemblies.

FIG. 12B shows first subassembly 1260 and second subassembly 1264 combined to form assembly 1268. Second subassembly is placed so that internal portion 1152 of third radiator panel 1150 and second heat-generating components 1266 are located between first radiator panel 1030 and second radiator panel 1040 and are generally not visible in this view. Second heat-generating components are relatively small compared with the space between first radiator panel 1030 and second radiator panel 1040 and so occupy a relatively small portion of this space, which may also accommodate first heat-generating components. Combining first subassembly 1260 and second subassembly 1264 may include physically connecting the assemblies (e.g., bolting, screwing, welding, clamping, gluing, or otherwise affixing the subassemblies) and may also include making electrical connections between subassemblies (e.g., using one or more connector, soldered connection, swaged connection or other connection to connect conductive elements such as wires, terminals or pins).

FIG. 12C shows assembly 1268 in front-view (along the y-direction) showing second radiator panel 1040 and external portion 1154 of third radiator panel 1150 (internal portion 1152 is behind second radiator panel 1040 in this view). FIG. 12C shows assembly 1268 having an overall height H1 (extent in the x-direction) and a width W1 (extent in the z-direction). These dimensions may be determined by the dimensions of a space in a satellite launch vehicle (e.g., dimensions of a payload fairing such as a 5 meter payload fairing). Second radiator panel 1040 has a width equal to W1 while external portion 1154 has a width of W2, which is less than W1 in this example. In other examples, W2 may be equal to W1. The height of external portion 1154 is H2 in this example and represents a relatively small part of overall height H1.

FIG. 12D shows assembly 1268 in side-view (along the z-direction) including first radiator panel 1030, second radiator panel 1040, frame 1262, third radiator panel 1050 and second heat-generating components 1266 attached to third radiator panel 1050. First radiator panel 1030, second radiator panel 1040 and third radiator panel 1050 may each be attached to frame 1262 so that the first radiator panel 1030 and second radiator panel 1040 are maintained a fixed distance apart. Assembly 1268 has a depth, D, which may be determined by dimensions of a space in a launch vehicle. Third radiator panel 1050 is equidistant from first radiator panel 1030 and second radiator panel 1040 in this example (e.g., approximately D/2 from each), which provides adequate space to locate second heat-generating components 1266 on either side of third radiator panel 1050 between first radiator panel 1030 and second radiator panel 1040. In other examples, third radiator panel may be off-center to provide a larger space on one side (e.g., to accommodate heat-generating components that are more than D/2 deep). While third radiator panel 1150 is shown as planar (like first radiator panel 1030 and second radiator panel 1040), radiator panels may be formed with non-planar features in some cases (e.g., to accommodate components that do not otherwise fit in given locations).

Because third radiator panel 1150 is relatively thin (has a depth less than D), an available space (usable volume) in a launch vehicle may not be efficiently occupied by assembly 1268 as illustrate. For example, spaces 1270, 1272 on either side of third radiator panel 1150 may be usable volume within a space that is W1 wide, H1 high and D deep. According to aspects of the present technology described below, additional components (e.g., external appendages that are not shown in FIG. 12D) may occupy such spaces when stowed in a launch configuration to efficiently use available space.

Second heat-generating components 1266 are only attached to third radiator panel 1150 in this example, not to first radiator panel 1030 or second radiator panel 1040. Similarly, first heat-generating components are only attached to first radiator panel 1030 and/or second radiator panel 1040, not to third radiator panel 1050. This arrangement of dedicated radiator panels for particular groups of heat-generating components provides modularity, which may facilitate manufacture and testing. In other examples, some or all second heat-generating components may additionally be attached to second and/or third radiator panels for additional heat dissipation.

FIG. 12E shows a top-down view (along x-direction) of assembly 1268 including first radiator panel 1030, second radiator panel 1040, frame 1262, third radiator panel 1150 and second heat-generating components 1266.

Figure 13:
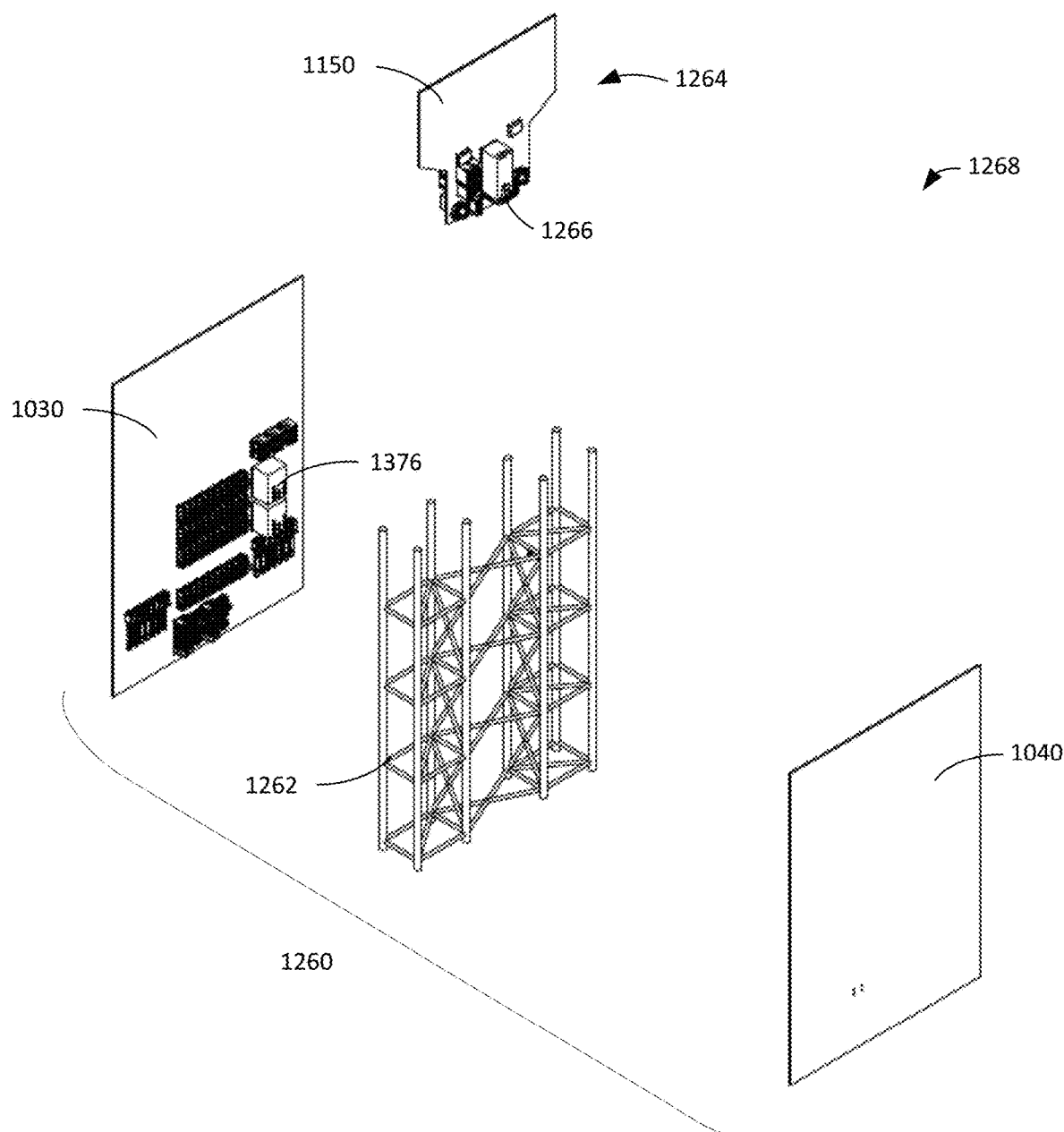
FIG. 13 shows an example of an assembly that includes a pair of oppositely-facing radiator panels and a third radiator panel in exploded view.

FIG. 13 shows an exploded view of assembly 1268 showing first radiator panel 1030 with first heat-generating components 1376. FIG. 13 also shows second radiator panel 1040 and frame 1262. Additional first heat-generating components (not visible in FIG. 13) may be attached to second radiator panel 1040. First heat-generating components may first be attached to first radiator panel 1030 and second radiator panel 1040 and then these panels may be attached to frame 1262 to form first subassembly 1260. Subsequently, second subassembly 1264, including third radiator panel 1150 and second heat-generating components 1266 may be attached to subassembly 1260 to form assembly 1268.

Figure 14:
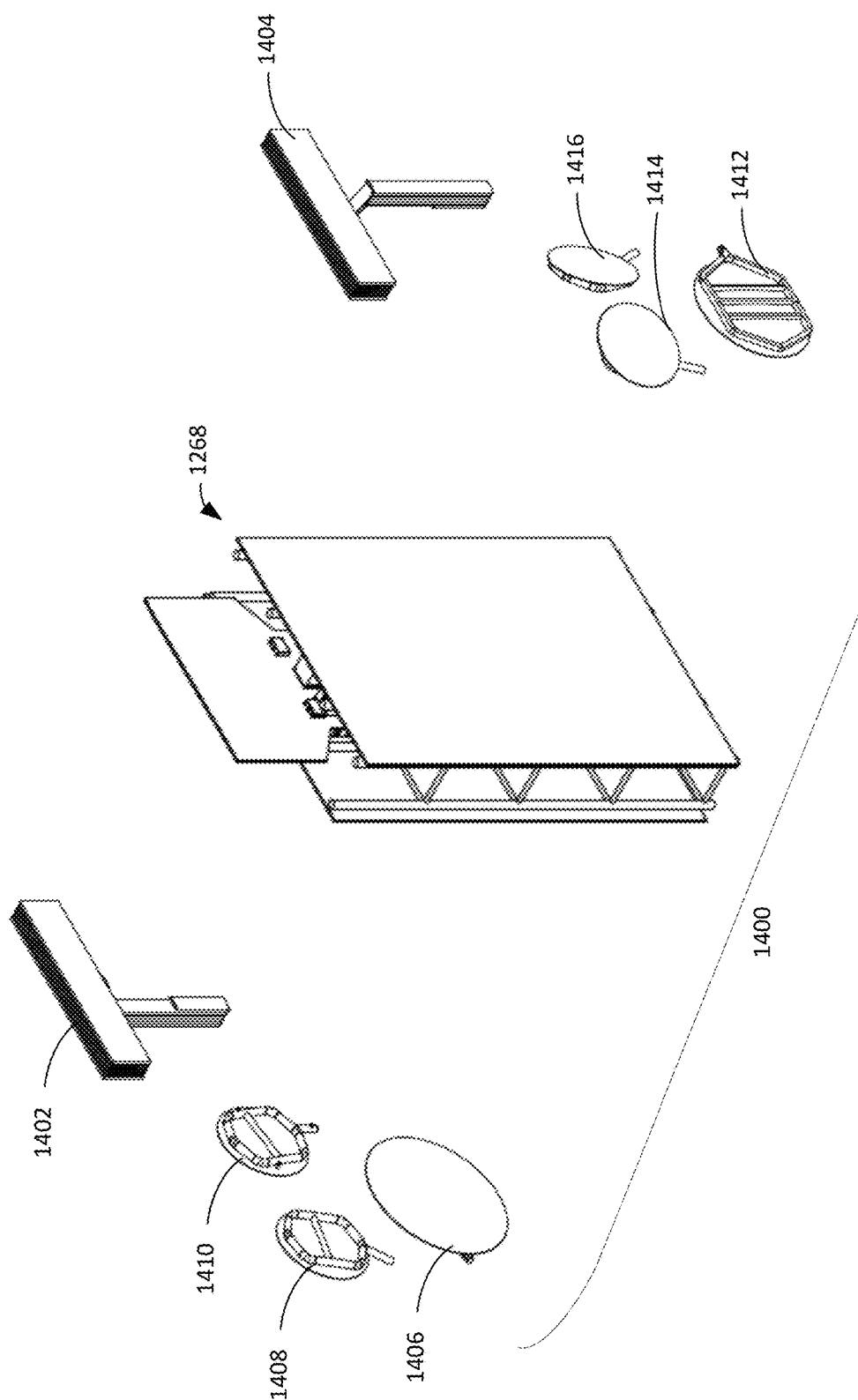
FIG. 14 shows an example of satellite components in exploded view.

FIG. 14 shows an exploded view of components of a satellite 1400 that includes assembly 1268 and additional components including first folding solar panel 1402, second folding solar panel 1404, first reflector 1406, second reflector 1408, third reflector 1410, fourth reflector 1412, fifth reflector 1414 and sixth reflector 1416 (these reflectors may be portions of antennas (e.g., array fed reflector, or AFR) corresponding to antennas 662). After assembly 1268 is complete, the additional components shown (and other components in some examples) may be combined with assembly 1268 to form satellite 1400. The additional components shown may be configured to be deployable from a compact configuration for launch (launch configuration) in a space of limited size (e.g., a payload fairing) to an extended configuration (deployed configuration) for operation in orbit.

Figures 15A, 15B:
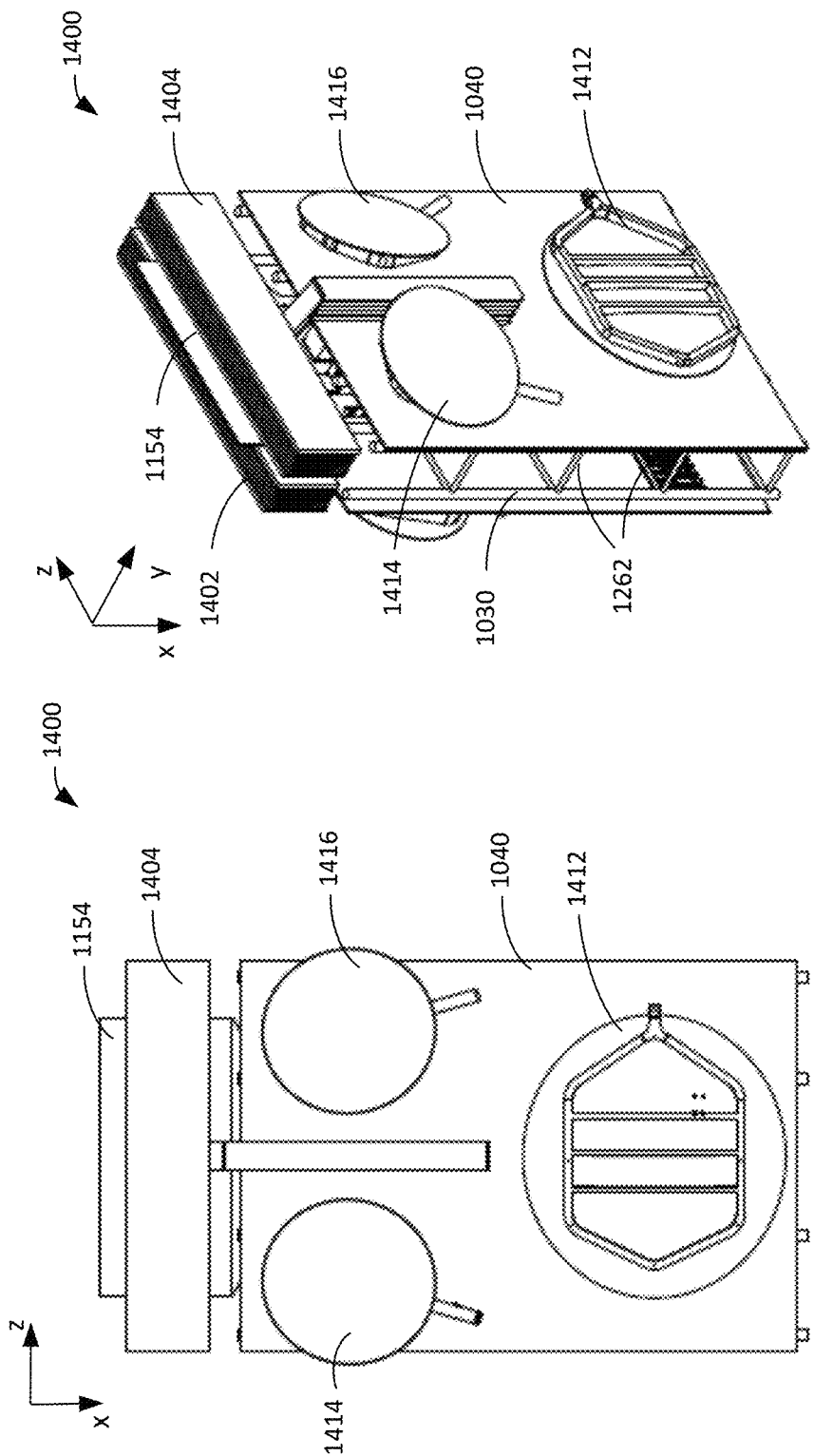
FIGS. 15A-C show an example of a satellite in different configurations.
Figure 15C:
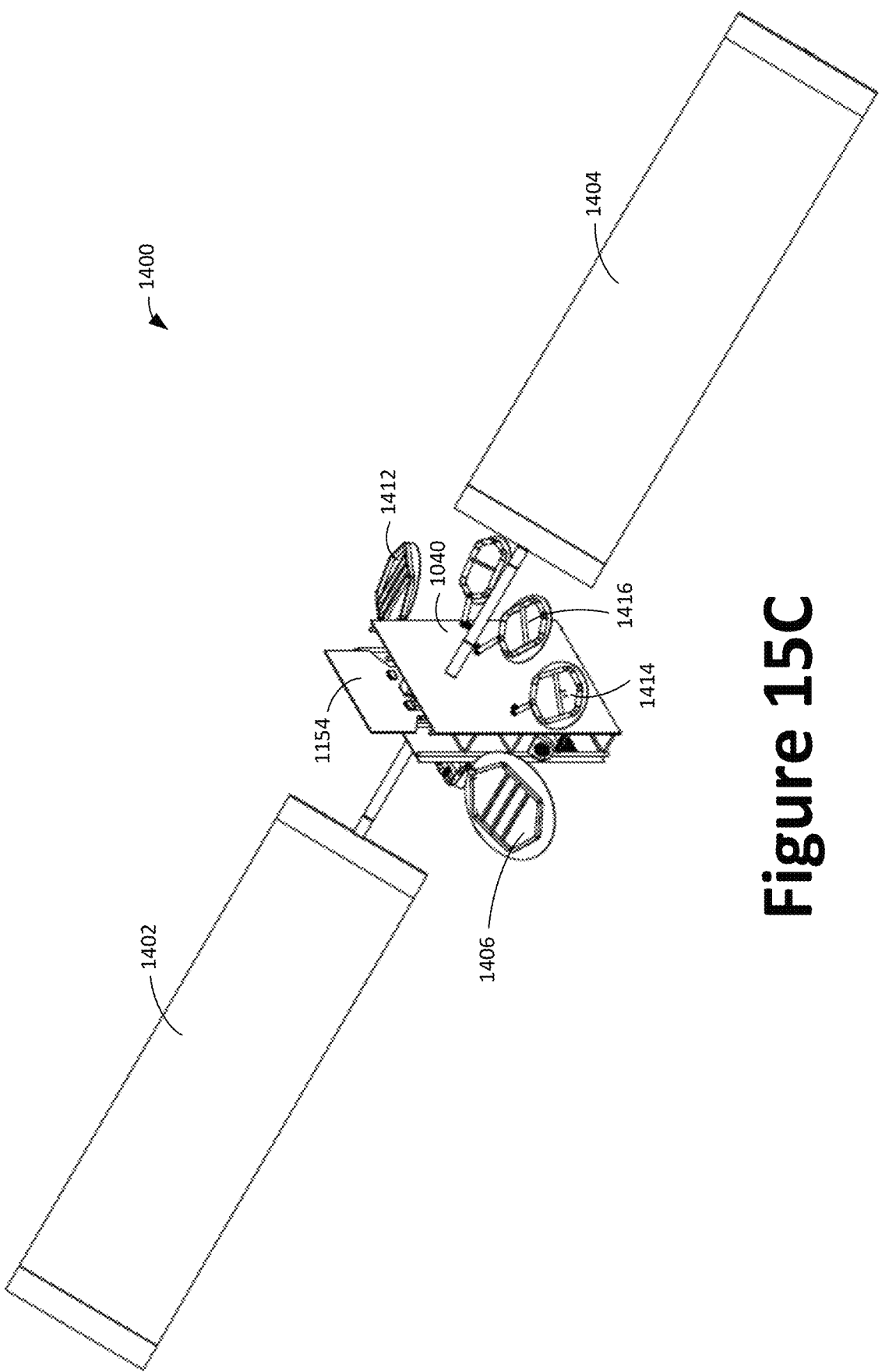

FIGS. 15A-C show satellite 1400 in different views and configurations. FIG. 15A a front-view (along the y-direction) including second radiator panel 1040 and external portion 1154 of third radiator panel 1150 as previously shown in FIG. 12C. FIG. 15A also shows second folding solar panel 1404 (in front of external portion 1154 of third radiator panel 1150 in this view), fourth reflector 1412, fifth reflector 1414 and sixth reflector 1416. Second folding solar panel 1404, fourth reflector 1412, fifth reflector 1414 and sixth reflector 1416 are each attached to second radiator panel 1040 in a manner that allows them to deploy (e.g., unfold) when in orbit. For example, a hinge or other articulation mechanism may be provided to allow these components to rotate out from the position shown and a suitable actuator (e.g., a spring, electric motor, or other actuator) may be provided to cause such rotation at a desired time. The dimensions of second folding solar panel 1404 are such that it fits within the usable space alongside external portion 1154 (e.g., has a width less than or equal to W1 and a height less than or equal to H2 so that it fits within space 1272).

FIG. 15B shows satellite 1400 in perspective-view (corresponding to FIG. 12B) including first radiator panel 1030, second radiator panel 1040, frame 1262, external portion 1154, first folding solar panel 1402, second folding solar panel 1404, fourth reflector 1412, fifth reflector 1414 and sixth reflector 1416 in a compact (launch) configuration. Folding solar panels are positioned on either side of external portion 1154. First folding solar panel 1402 lies alongside external portion 1154 on one side (e.g., occupying space 1270 illustrated in FIG. 12D) and second folding solar panel 1404 lies alongside external portion 1154 on the other side (e.g., occupying space 1272 illustrated in FIG. 12D). This compact configuration efficiently uses available space in a launch vehicle. Fourth reflector 1412, fifth reflector 1414 and sixth reflector 1416 are folded against second radiator panel 1040 in this configuration for compact storage.

FIG. 15C illustrates satellite 1400 in the extended (deployed) configuration (e.g., on-station, in orbit). First folding solar panel 1402 and second folding solar panel 1404 are unfolded so that external portion 1154 of third radiator panel 1150 is unobstructed on either side. First folding solar panel 1402 and second folding solar panel 1404 may be directed towards the sun in this configuration for efficient capture of solar radiation and radiator panels may be directed north and south for efficient radiation of heat. First reflector 1406, fourth reflector 1412, fifth reflector 1414 and sixth reflector 1416 are rotated out to be directed towards earth. Additional components of satellite 1400 (e.g., feed arrays and thrusters) are not shown here for clarity and it will be understood that various additional components may be provided in satellites employing the present technology.

Figure 16:
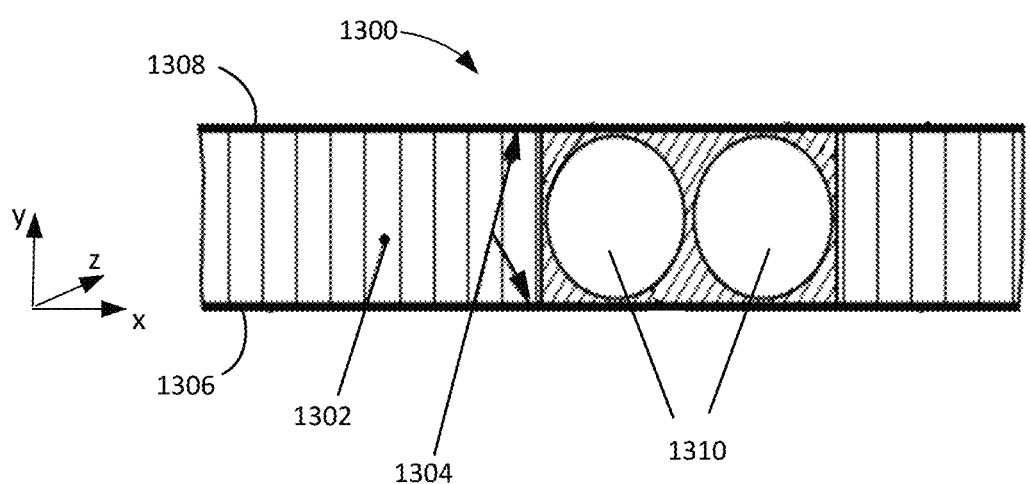
FIG. 16 illustrates an example of a radiator panel in cross section.

Radiator panels (e.g., any of the radiator panels discussed above) may be formed of any suitable material and may have any suitable structure for enabling heat flow from heat-generating components and for radiating the heat into space. FIG. 16 shows an example of a portion of a radiator panel 1300 (e.g., any of the radiator panels of the above examples) in cross section along the x-y plane. Radiator panel 1300 includes a honeycomb structure 1302 (e.g., formed of Aluminum with cavities) that extends between outer layers 1304. Heat-generating components may be attached to a first surface 1306 so that heat is transferred through honeycomb structure 1302 and outer layers 1304 and is radiated from second surface 1308. Alternatively, heat-generating components may be attached to both surfaces (e.g., of third radiator panel 1150) and may move laterally to be radiated from another area of a radiator panel (e.g., from internal portion 1152 to external portion 1154). Two heat pipes 1310 (e.g., constant conduction heat pipes) are shown in cross section in FIG. 16. Heat pipes 1310 may be filled with ammonia or other coolant so that heat may travel laterally (along the x-z plane). This moves heat away from heat-generating components and distributes heat evenly across radiator panel 1300 to be radiated into space. While one or more pumps may be provided to move such coolant in some examples, passive methods may be sufficient to move such coolant over relatively short distances (e.g., within a single radiator panel) so that pumps may not be necessary. Heat-generating components may be attached to radiator panels (e.g., radiator panel 1300) using a thermally conductive material so that heat can easily flow from such heat-generating components into radiator panels.

Heat-generating components may be combined with radiator panels so that each radiator panel (or pair of oppositely-facing radiator panels) has sufficient area to radiate heat from all heat-generating components attached to it (or them). In this way, heat may be independently managed in each subassembly of a satellite so that no coolant flow between such subassemblies is required.

An example of a satellite includes a first radiator panel, a second radiator panel and a space defined between the first radiator panel and the second radiator panel. One or more first heat-generating components are located in the space, each of the first heat-generating components attached to at least one of the first or second radiator panels. A third radiator panel extends from the space and one or more second heat-generating components are located in the space, each of the second heat-generating components attached to the third radiator panel.

The first radiator panel may extend along a first plane and the second radiator panel extends along a second plane that is parallel to the first plane. The third radiator panel may extend along a third plane that is between and parallel to the first plane and the second plane. The first heat-generating components may be payload components and the second heat-generating components are satellite bus components. The first and second radiator panels may be configured to radiate heat from the payload components and the third radiator panel may be configured to radiate heat from the satellite bus components. The satellite may include one or more folding panels. In a launch configuration, the one or more folding solar panels may be folded and are stored alongside the third radiator panel. The third radiator panel may include an internal portion within the space and an external portion that extends outside the space, and the second heat-generating components may be attached to the internal portion. The third radiator panel may have a first side and a second side, one or more of the second heat-generating components may be attached to the first side and one or more of the second heat-generating components may be attached to the second side. The first and second radiator panels may be attached to a frame that is located in the space and the third radiator panel may be attached to the frame substantially equidistant from the first and second radiator panels.

An example of heat radiating device for a satellite includes a first radiator panel extending along a first plane, a second radiator panel extending along a second plane that is parallel to the first plane, the second radiator panel displaced from the first radiator panel in a direction perpendicular to the first and the second planes to define a space between the first radiator panel and the second radiator panel and each of the first radiator panel and the second radiator panel configured to be coupled to at least one of a plurality of first heat-generating components. The satellite may further include a third radiator panel extending along a third plane that is parallel to the first plane and the second plane and is located between the first plane and the second plane, the third radiator panel having an internal portion within the space between the first radiator panel and the second radiator panel and an external portion that extends beyond the space between the first radiator panel and the second radiator panel and the third radiator panel configured to be coupled to at least one of a plurality of second heat-generating components.

The first radiator panel may have a substantially rectangular shape, the second radiator panel may have a substantially rectangular shape and the space between the first and second radiator panels may have a substantially rectangular shape. The external portion may have a substantially rectangular shape and the external portion may have a width that is less than or equal to the width of the first and second radiator panels. The satellite may further include one or more folding solar panels that have a width that is less than or equal to the width of the first and second radiator panels and a height that is substantially equal to the height of the external portion. The one or more folding solar panels may include a first folding solar panel that is configured for storage along a first side of the external portion and a second folding solar panel that is configured for storage along a second side of the external portion. The first heat-generating components may be payload components including a digital channelizer and an amplifier and the second heat-generating components may be satellite bus components including a power controller. The third radiator panel may be substantially equidistant from the first and second radiator panels and the second heat-generating components may be attached to a first side and a second side of the third radiator panel.

An example of a satellite includes a pair of oppositely-facing payload radiator panels of substantially similar size and shape that extend in parallel, a space between the pair of payload radiator panels and a plurality of satellite payload components attached to the pair of payload radiator panels. The satellite further includes a bus radiator panel extending parallel to the pair of payload radiator panels, the bus radiator panel having an internal portion within the space and an external portion that extends beyond the space and a plurality of satellite bus components attached to the bus radiator panel.

The plurality of satellite bus components may include first satellite bus components attached to a first side of the bus radiator panel and second satellite bus components attached to a second side of the bus radiator panel. The satellite may further include a first folding solar panel configured to fold against a first side of the external portion of the bus radiator panel and a second folding solar panel configured to fold against a second side of the external portion of the bus radiator panel.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A satellite comprising:
a first radiator panel extending along a first plane;
a second radiator panel extending along a second plane that is parallel to the first plane;
a space defined between the first radiator panel and the second radiator panel;
one or more first heat-generating components located in the space, each of the first heat-generating components is attached to at least one of the first or second radiator panels;
a third radiator panel that is planar, the third radiator panel includes an internal portion within the space and an external portion extending from the space, the internal portion and the external portion extend along a third plane that is parallel to the first and second planes; and
one or more second heat-generating components located in the space, each of the second heat-generating components is attached to the third radiator panel.

2. The satellite of claim 1, further comprising a first folding solar panel configured to fold against a first side of the external portion and a second folding solar panel configured to fold against a second side of the external portion.

3. The satellite of claim 2, wherein the first and second folding solar panels are configured to deploy by rotating away from the external portion.

4. The satellite of claim 1, wherein the first heat-generating components are payload components and the second heat-generating components are satellite bus components.

5. The satellite of claim 4, wherein the first and second radiator panels are configured to radiate heat from the payload components and the third radiator panel is configured to radiate heat from the satellite bus components.

6. The satellite of claim 1, further comprising one or more folding solar panels that, in a launch configuration, are folded and stored alongside the third radiator panel.

7. The satellite of claim 1 wherein the first heat-generating components attached to the at least one of the first and second radiator panels are configured to operate at a first temperature and the second heat-generating components attached to the third radiator panel are configured to operate at a second temperature that is lower or higher than the first temperature.

8. The satellite of claim 1, wherein the first, second and third panels have a honeycomb structure.

9. The satellite of claim 8, wherein the third radiator panel has a first side and a second side, one or more of the second heat-generating components are attached to the first side and one or more of the second heat-generating components are attached to the second side.

10. The satellite of claim 8, wherein the first and second radiator panels are attached to a frame that is located in the space and the third radiator panel is attached to the frame equidistant from the first and second radiator panels.

11. A heat radiating device for a satellite comprising:
a first radiator panel extending along a first plane;
a second radiator panel extending along a second plane that is parallel to the first plane, the second radiator panel displaced from the first radiator panel in a direction perpendicular to the first and the second planes to define a space between the first radiator panel and the second radiator panel;
each of the first radiator panel and the second radiator panel configured to be coupled to at least one of a plurality of first heat-generating components;
a third radiator panel that is planar and extends along a third plane, the third plane is parallel to the first plane and the second plane and is located between the first plane and the second plane, the third radiator panel having an internal portion that extends along the third plane within the space between the first radiator panel and the second radiator panel and an external portion that extends along the third plane beyond the space between the first radiator panel and the second radiator panel; and
the third radiator panel configured to be coupled to at least one of a plurality of second heat-generating components.

12. The heat radiating device of claim 11, wherein the first radiator panel has a substantially rectangular shape, the second radiator panel has a substantially rectangular shape and the space between the first and second radiator panels has a substantially rectangular shape.

13. The heat radiating device of claim 12, wherein the external portion has a substantially rectangular shape and the external portion has a width that is less than or equal to the width of the first and second radiator panels.

14. The heat radiating device of claim 13, further comprising one or more folding solar panels that have a width that is less than or equal to the width of the first and second radiator panels and a height that is equal to the height of the external portion.

15. The heat radiating device of claim 14, wherein the one or more folding solar panels includes a first folding solar panel that is configured for storage along a first side of the external portion and a second folding solar panel that is configured for storage along a second side of the external portion.

16. The heat radiating device of claim 11, wherein the first heat-generating components are payload components including a digital channelizer and an amplifier and the second heat-generating components are satellite bus components including a power controller.

17. The heat radiating device of claim 11, wherein the third radiator panel is substantially equidistant from the first and second radiator panels and the second heat-generating components are attached to a first side and a second side of the third radiator panel.

18. A satellite comprising:
a pair of oppositely-facing payload radiator panels of substantially similar size and shape that extend in parallel;
a space between the pair of payload radiator panels;
a plurality of satellite payload components attached to the pair of payload radiator panels;
a bus radiator panel extending parallel to the pair of payload radiator panels, the bus radiator panel is planar, the bus radiator panel has an internal portion that extends along a plane that is parallel to the pair of payload radiator panels within the space and an external portion that extends along the plane beyond the space; and
a plurality of satellite bus components attached to the bus radiator panel.

19. The satellite of claim 18, wherein the plurality of satellite bus components includes first satellite bus components attached to a first side of the bus radiator panel and second satellite bus components attached to a second side of the bus radiator panel.

20. The satellite of claim 18, further comprising a first folding solar panel configured to fold against a first side of the external portion of the bus radiator panel and a second folding solar panel configured to fold against a second side of the external portion of the bus radiator panel, the first and second folding solar panels are configured to deploy by rotating away from the first and second sides of the external portion.

* * * * *